United States Patent
Nakasho et al.

(10) Patent No.: US 9,956,913 B2
(45) Date of Patent: May 1, 2018

(54) SURROUNDINGS-MONITORING DEVICE AND COMPUTER PROGRAM PRODUCT

(71) Applicant: AISIN SEIKI KABUSHIKI KAISHA, Kariya-shi, Aichi (JP)

(72) Inventors: Takayuki Nakasho, Anjo (JP); Kazuya Watanabe, Anjo (JP); Tetsuya Maruoka, Anjo (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 0 days. days.

(21) Appl. No.: 14/769,947

(22) PCT Filed: Jan. 10, 2014

(86) PCT No.: PCT/JP2014/050386
§ 371 (c)(1),
(2) Date: Aug. 24, 2015

(87) PCT Pub. No.: WO2014/156220
PCT Pub. Date: Oct. 2, 2014

(65) Prior Publication Data
US 2016/0001704 A1    Jan. 7, 2016

(30) Foreign Application Priority Data
Mar. 28, 2013 (JP) ................. 2013-070481

(51) Int. Cl.
*B60R 1/00*    (2006.01)
*G07C 5/08*    (2006.01)

(52) U.S. Cl.
CPC .............. *B60R 1/00* (2013.01); *G07C 5/0891* (2013.01); *B60R 2300/105* (2013.01);
(Continued)

(58) Field of Classification Search
CPC ................ B60R 1/00; B60R 2300/102; B60R 2300/103; B60R 2300/108;
(Continued)

(56) References Cited

U.S. PATENT DOCUMENTS 8,134,595 B2    3/2012  Takano
2003/0040851 A1*  2/2003  Ichikawa ................. B60R 1/00
                                                    701/1
(Continued)

FOREIGN PATENT DOCUMENTS

JP       6-227318 A      8/1994
JP    2002-354467 A    12/2002
(Continued)

OTHER PUBLICATIONS

Communication dated Mar. 15, 2016, issued by the Japan Patent Office in corresponding Japanese Application No. 2014-003794.
(Continued)

*Primary Examiner* — Dale Moyer
(74) *Attorney, Agent, or Firm* — Sughrue Mion, PLLC

(57) ABSTRACT

A surroundings-monitoring device according to embodiments includes, as an example, a memory unit that stores therein captured image data output from an imaging unit imaging an area including a road surface in a forward direction of a vehicle and an area extending upward from the road surface and an output unit that outputs, to a display device, captured image data having been previously imaged by the imaging unit and including a road surface corresponding to a position of the current vehicle in the imaged road surface, from among the captured image data stored in the memory unit.

14 Claims, 13 Drawing Sheets

(52) U.S. Cl.
CPC ... *B60R 2300/303* (2013.01); *B60R 2300/802* (2013.01); *B60R 2300/806* (2013.01)

(58) Field of Classification Search
CPC .. B60R 2300/207; B60R 2300/304–2300/305; B60R 1/002; B60R 2300/802
See application file for complete search history.

(56) References Cited

U.S. PATENT DOCUMENTS

| | | | |
|---|---|---|---|
| 2005/0174429 | A1 | 8/2005 | Yanai |
| 2007/0109408 | A1* | 5/2007 | Watanabe ............... B60R 1/00 348/148 |
| 2007/0285549 | A1* | 12/2007 | Takano .................. B60R 1/00 348/333.01 |
| 2010/0201818 | A1 | 8/2010 | Imanishi et al. |
| 2011/0141281 | A1* | 6/2011 | Barefoot ................ B60R 1/00 348/148 |
| 2012/0154590 | A1 | 6/2012 | Watanabe |
| 2012/0158243 | A1* | 6/2012 | Pupin ................ B62D 15/0295 701/36 |
| 2012/0158256 | A1* | 6/2012 | Kuboyama ........ B62D 15/0295 701/51 |
| 2013/0010118 | A1* | 1/2013 | Miyoshi ................. B60R 1/00 348/148 |
| 2016/0031371 | A1* | 2/2016 | Kimata .................. B60R 1/00 348/148 |
| 2016/0101734 | A1* | 4/2016 | Baek ..................... B60R 1/00 348/148 |

FOREIGN PATENT DOCUMENTS

| | | | | |
|---|---|---|---|---|
| JP | 2003-009141 | A | 1/2003 | |
| JP | 2003-81014 | A | 3/2003 | |
| JP | 2005-001570 | A | 1/2005 | |
| JP | 2005223524 | A | 8/2005 | |
| JP | 2006168699 | A | 6/2006 | |
| JP | 2006-238131 | A | 9/2006 | |
| JP | 2007-22176 | A | 2/2007 | |
| JP | 2007-102798 | A | 4/2007 | |
| JP | 2007-325074 | A | 12/2007 | |
| JP | 2008-236507 | A | 10/2008 | |
| JP | 2010-23704 | A | 2/2010 | |
| JP | 2010-74260 | A | 4/2010 | |
| JP | 2010-109684 | A | 5/2010 | |
| JP | WO 2011010346 | A1 * | 1/2011 | ......... B62D 15/0275 |
| JP | 2011-160346 | A | 8/2011 | |
| JP | WO 2011118260 | A1 * | 9/2011 | ............... B60R 1/00 |
| WO | 2011030699 | A1 | 3/2011 | |

OTHER PUBLICATIONS

Communication dated Mar. 9, 2016, issued by the European Patent Office in corresponding European Application No. 14775926.0.
International Search Report of PCT/JP2014/050386 dated Feb. 25, 2014 [PCT/ISA/210].
Written Opinion of PCT/JP2014/050386 dated Feb. 25, 2014 [PCT/ISA/237].
Communication dated May 31, 2016 from the Japanese Patent Office in counterpart application No. 2014-003794.

* cited by examiner

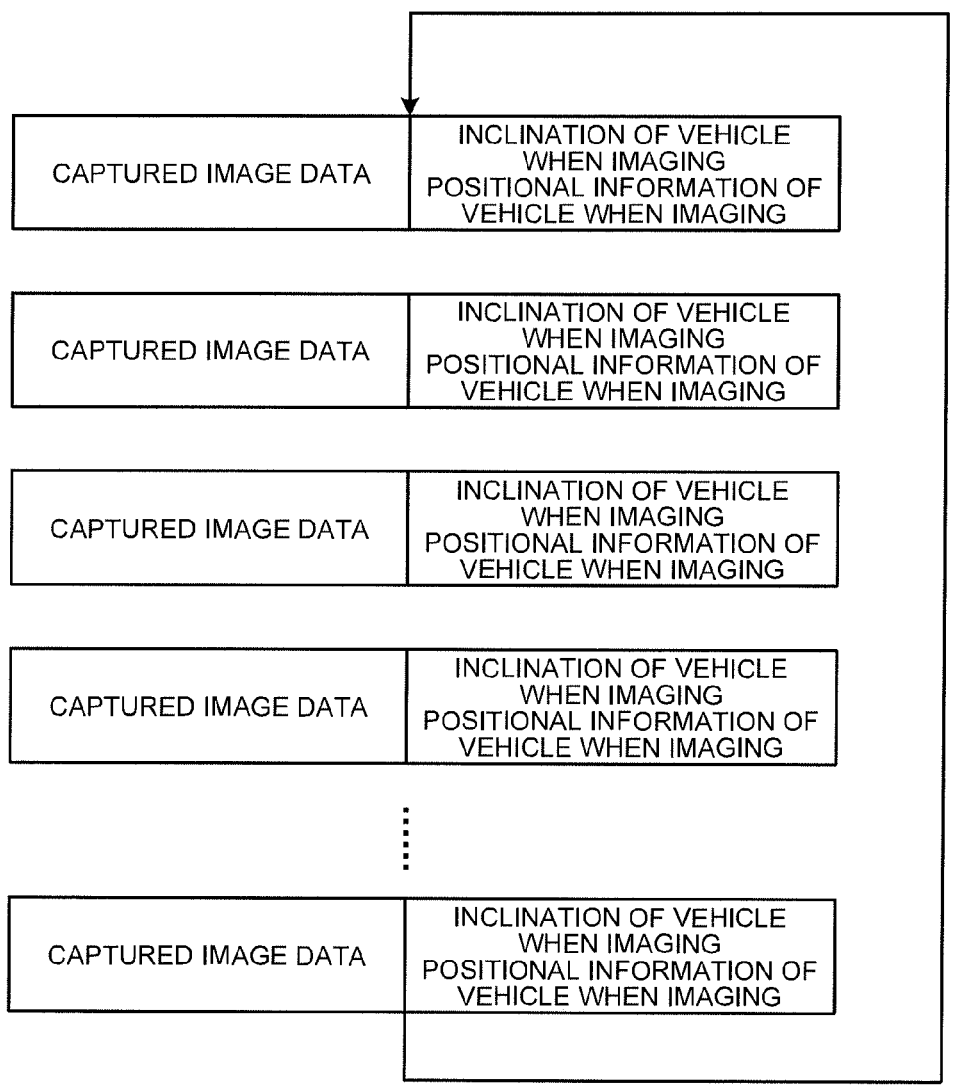

SURROUNDINGS-MONITORING DEVICE AND COMPUTER PROGRAM PRODUCT

CROSS REFERENCE TO RELATED APPLICATIONS

This application is national stage application of International Application No. PCT/JP2014/050386, filed Jan. 10, 2014, which designates the United States, incorporated herein by reference, and which claims the benefit of priority from Japanese Patent Application No. 2013-070481, filed Mar. 28, 2013, the entire contents of which are incorporated herein by reference.

TECHNICAL FIELD

Embodiments relate to a surroundings-monitoring device and a computer program product.

BACKGROUND ART

Such a driving support technique has been developed that helps a driver park a vehicle by imaging the surroundings of the vehicle with an in-vehicle camera and displaying captured image data, which is a result of the imaging.

Patent Document 1: Japanese Laid-open Patent Publication No. 2002-354467

Patent Document 2: Japanese Laid-open Patent Publication No. 2007-102798

Patent Document 3: Japanese Laid-open Patent Publication No. 2003-009141

DISCLOSURE OF INVENTION

Problem to be Solved by the Invention

However, in displaying captured image data imaged by an in-vehicle camera, such a conventional technique has difficulty in perceiving conditions around the underfloor area of the vehicle depending on the view angle of the camera.

Means for Solving Problem

According to the embodiments, for an example, a surroundings-monitoring device comprises: a memory unit that stores therein captured image data output from an imaging unit imaging an area including a road surface in a forward direction of a vehicle and an area extending upward from the road surface; and an output unit that outputs, to a display device, captured image data having been previously imaged by the imaging unit and having an image of a road surface corresponding to a position of the current vehicle in the imaged road surface, from among the captured image data stored in the memory unit. As an example, the surroundings-monitoring device enables a driver to perceive a blind area existing around the vehicle, which exerts an effect of reducing stress of driving.

According to the above surroundings-monitoring device, for an example, the output unit superimposes identification information from which a specific part of the current vehicle is identifiable on the captured image data to be output. As an example, the surroundings-monitoring device displays a specific part of the vehicle on a blind area, which exerts an effect of facilitating understanding of the relation between the specific part of the vehicle and its surroundings.

According to the above surroundings-monitoring device, for an example, the output unit superimposes information for identifying a specific part placed under a floor of the vehicle as the identification information.

As an example, the surroundings-monitoring device displays the position of an underfloor structural body such as an axle and a differential gear, which exerts an effect of facilitating understanding of the relation between the underfloor part of the vehicle and its surroundings.

According to the above surroundings-monitoring device, for an example, the surroundings-monitoring device further comprises an acquiring unit that acquires an amount of travel of the vehicle. The memory unit further stores therein the captured image data and positional information on a position at which the imaging unit has imaged the captured image data in a manner associated with each other. The output unit outputs the captured image data that has been selected as captured image data including a position of the current vehicle in an imaged area based on the amount of travel acquired by the acquiring unit and the positional information stored in the memory unit. As an example, the surroundings-monitoring device can output captured image data including the position of the current vehicle in an imaged range from among a plurality of pieces of captured image data previously photographed, which exerts an effect of facilitating understanding of the surroundings of the vehicle.

According to the above surroundings-monitoring device, for an example, the output unit outputs only captured image data having been imaged from any position of the vehicle from among a plurality of pieces of the captured image data stored in the memory unit. As an example, the surroundings-monitoring device does not perform composition processing on a plurality of pieces of captured image data photographed at a plurality of times, which exerts an effect of reducing the load of processing.

According to the above surroundings-monitoring device, for an example, the output unit outputs the captured image data having been imaged by the imaging unit with a direction in which the vehicle is moved and an optical axis of the imaging unit intersects with a road surface as an imaging direction. As an example, the surroundings-monitoring device outputs captured image data including conditions of the road surface in a forward direction of the vehicle, which exerts an effect of facilitating visual perception of the surroundings of the vehicle.

According to the above surroundings-monitoring device, for an example, the surroundings-monitoring device further comprises a receiving unit that receives pressing of a certain button. The output unit outputs captured image data being currently imaged by the imaging unit and, when the receiving unit receives pressing of the certain button, outputs captured image data having been previously imaged by the imaging unit and including a position of the current vehicle in an imaged area from among the captured image data stored in the memory unit. As an example, the surroundings-monitoring device can output captured image data including an area where the current vehicle is positioned whenever the driver hopes to understand the surroundings of the vehicle, which exerts an effect of reducing stress of the driver during driving.

According to the embodiments, for an example, a computer program that causes a computer to execute: a step of storing, in a memory unit, captured image data output from an imaging unit imaging an area including a road surface in a forward direction of a vehicle and an area extending upward from the road surface; and an output step of outputting, to a display device, captured image data having been previously imaged by the imaging unit and including a road surface corresponding to a position of the current vehicle in the imaged road surface, from among the captured image data stored in the memory unit. As an example, the computer program helps the user perceive a blind area existing around the vehicle, which can exerts an effect of reducing stress of driving.

BRIEF DESCRIPTION OF DRAWINGS

FIG. 7 is a drawing that illustrates the configuration of a ring buffer according to the first embodiment.

BEST MODE(S) FOR CARRYING OUT THE INVENTION

In the later-described embodiments, examples of a vehicle 1 may include a vehicle (a vehicle with an internal combustion engine) having an internal combustion engine (an engine, not illustrated) serving as a drive source, a vehicle (such as an electric vehicle and a fuel-cell vehicle) having an electric motor (a motor, not illustrated) serving as a drive source, and a vehicle (a hybrid vehicle) having both of an internal combustion engine and an electric motor serving as drive sources. The vehicle 1 may mount various kinds of transmissions and may further mount various kinds of devices (including a system and a part) necessary to drive the internal combustion engine and the electric motor. With regards to a device for driving a wheel 3 of the vehicle 1, the system, the number of devices, and the layout may be determined as appropriate.

First Embodiment

Figure 1:
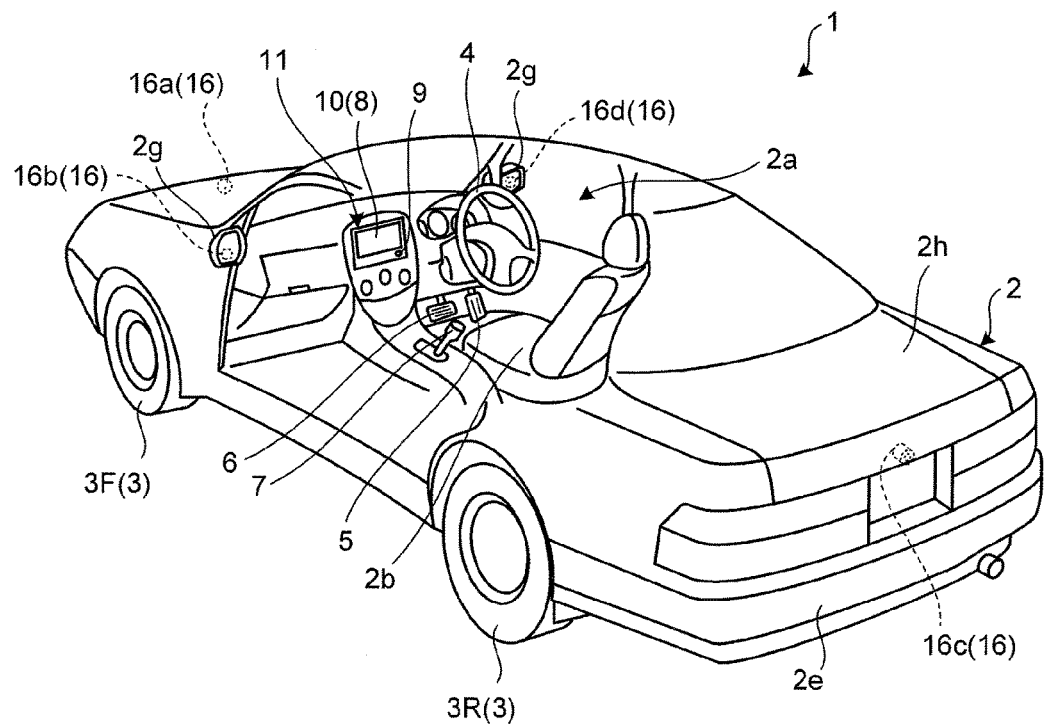
FIG. 1 is a perspective view that illustrates an example of the status in which the room of a vehicle according to a first embodiment is partly viewed in a perspective manner.

As illustrated in FIG. 1, a vehicle body 2 according to a first embodiment has a vehicle room 2a accommodating therein a passenger (not illustrated). The vehicle room 2a includes, in the condition of facing a seat 2b of a driver getting therein as a passenger, a steering 4, an accelerator 5, a brake 6, a gearshift 7, and the like. In the embodiment, as an exemplary configuration, the steering 4 is implemented as a steering wheel projecting from a dashboard (an instrument panel), the accelerator 5 is implemented as an accelerator pedal positioned under the feet of the driver, the brake 6 is implemented as a brake pedal positioned under the feet of the driver, and the gearshift 7 is implemented as a shift lever projecting from a center console. The embodiment is, however, not limited to this configuration.

The vehicle room 2a further includes a display device 8 (a display output unit) and a sound output device 9 (a sound output unit). Examples of the display device 8 include a liquid crystal display (LCD) and an organic electroluminescent display (OELD). Examples of the sound output device 9 include a speaker. In the embodiment, as an exemplary configuration, the display device 8 is covered with a transparent operation input unit 10 (such as a touch panel). The passenger and others can visually recognize a video image (a picture image) displayed on a display screen of the display device 8 through the operation input unit 10. The passenger and others can make an operation input (an instruction input) by touching, pressing, or moving the operation input unit 10 with a finger and the like at a position corresponding to the video image (the picture image) displayed on the display screen of the display device 8. In the embodiment, as an exemplary configuration, the display device 8, the sound output device 9, the operation input unit 10, and others are installed to a monitor 11 positioned in the center of the dashboard in the width direction (in the lateral direction) of the vehicle. The monitor 11 may have an operation input unit (not illustrated) such as a switch, a dial, a joystick, and a pressing button. Another sound output device (not illustrated) may be installed in a position different from the position of the monitor 11 in the vehicle room 2a, and sounds may be output from the different sound output device and the sound output device 9 of the monitor 11. In the embodiment, as an exemplary configuration, the monitor 11 is shared with a navigation system and an audio system; however, an exclusive monitor for a surroundings-monitoring device may be installed separately from these systems.

Figure 2:
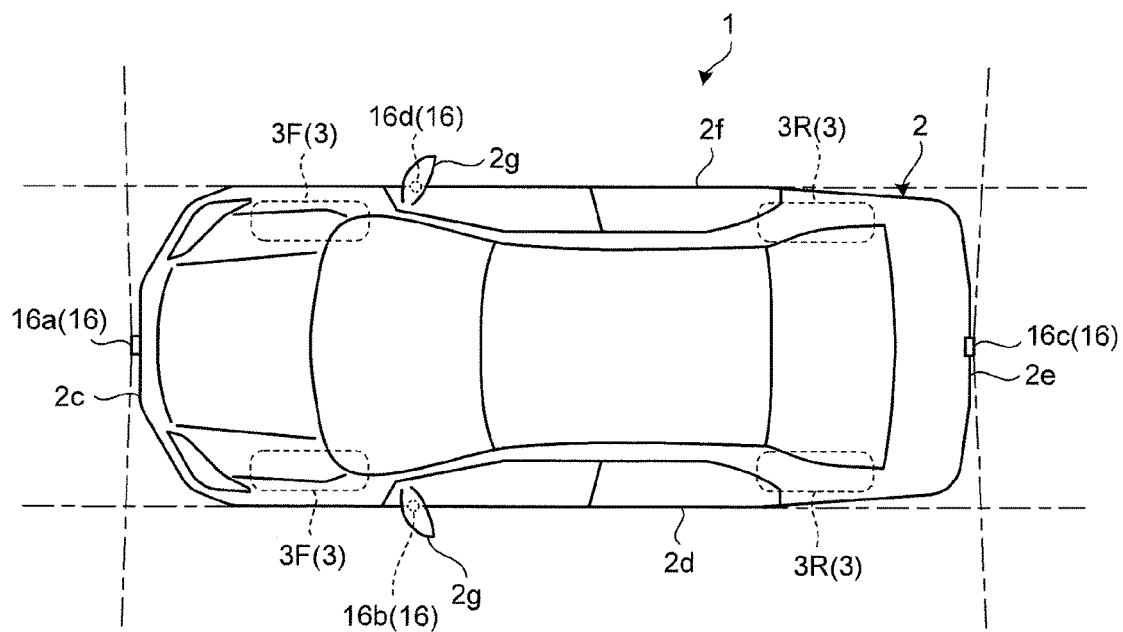
FIG. 2 is a planar view (overhead view) that illustrates an example of the vehicle according to the first embodiment.
Figure 3:
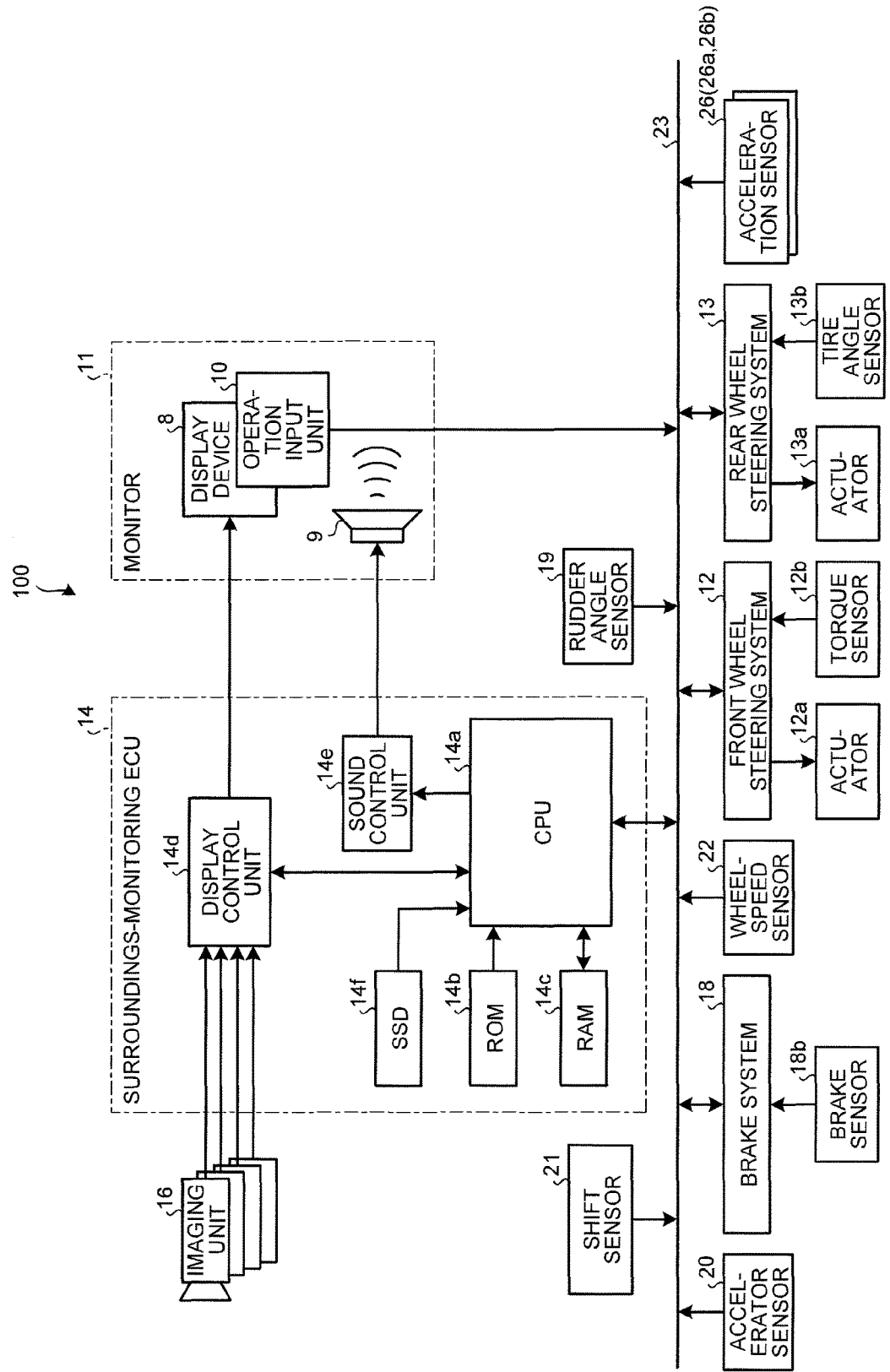
FIG. 3 is a block diagram that illustrates an example of a surroundings-monitoring system of the vehicle according to the first embodiment.

As illustrated in FIGS. 1 and 2, in the embodiment, as an exemplary configuration, the vehicle 1 is implemented as a four-wheel vehicle (a four-wheel motor vehicle) with two front wheels 3F in the left and right sides and two rear wheels 3R in the left and right sides. Furthermore, in the embodiment, these four wheels 3 are configured to be steerable (turnable). In specific, as illustrated in FIG. 3, the vehicle 1 has a front wheel steering system 12 for steering the front wheels 3F and a rear wheel steering system 13 for steering the rear wheels 3R. The front wheel steering system 12 and the rear wheel steering system 13 are electrically controlled by a surroundings-monitoring electronic control unit (ECU) 14 and the like and drive actuators 12a and 13a, respectively. Examples of the front wheel steering system 12 and the rear wheel steering system 13 include an electric power steering system and a steer by wire (SBW) system. With the actuators 12a and 13a, the front wheel steering system 12 and the rear wheel steering system 13 add torque (assist torque) to the steering 4 so as to increase the steering force and steer (automatically steer) the wheels 3 (the front wheels 3F and the rear wheels 3R, respectively). The actuators 12a and 13a each may steer a single wheel 3 or steer a plurality of wheels 3. In the embodiment, as an exemplary configuration, the two front wheels 3F are steered in phase (in the same phase, in the same turning direction, and in the same rotating direction) in a substantially parallel manner. The two rear wheels 3R are also steered in phase in a substantially parallel manner. Drive wheels can be determined as appropriate.

In the embodiment, as illustrated in FIG. 2 as an exemplary configuration, the vehicle 1 (the vehicle body 2) has a plurality (in the embodiment, four units as an example) of imaging units 16 (16a to 16d). Examples of the imaging unit 16 include a digital camera incorporating therein an imaging element such as a charge coupled device (CCD) and a CMOS image sensor (CIS). The imaging unit 16 is capable of outputting image data (video data and frame data) at a certain frame rate. Each of the imaging units 16 has a wide angle lens and is capable of photographing a range (a view angle) of 140 to 220 degrees in the horizontal direction. The optical axis of the imaging unit 16 is set toward a downward (an obliquely downward) direction, and the imaging unit 16 photographs the surroundings of the vehicle body 2 including a road surface on which the vehicle 1 can travel.

In the embodiment, as an exemplary configuration, an imaging unit 16a is positioned at an end 2c (an end in a planar view) in the front side (the front side in the longitudinal direction of the vehicle) of the vehicle body 2 and provided to a front bumper or the like. An imaging unit 16b is positioned at an end 2d in the left side (the left side in the width direction of the vehicle) of the vehicle body 2 and provided to a left side mirror 2g (a projecting portion). An imaging unit 16c is positioned at an end 2e in the rear side (the rear side in the longitudinal direction of the vehicle) of the vehicle body 2 and provided to a wall portion on the lower part of a door 2h of a rear trunk. An imaging unit 16d is positioned at an end 2f in the right side (the right side in the width direction of the vehicle) of the vehicle body 2 and provided to a right side mirror 2g (a projecting portion). The embodiment is not intended to limit the method for mounting a camera on a vehicle. The imaging unit 16a may be installed in a manner that can acquire image data in the front direction of the vehicle, the imaging units 16b and 16d may be installed in a manner that can acquire image data in the lateral direction of the vehicle, and the imaging unit 16c may be installed in a manner that can acquire image data in the rear direction of the vehicle.

The surroundings-monitoring ECU 14 performs calculating processing and image processing on image data obtained by the imaging units 16 and can display image data having undergone the image processing on the display device 8.

In the embodiment, as illustrated in FIG. 3 as an exemplary configuration, a surroundings-monitoring system 100 includes a brake system 18, a rudder angle sensor 19 (an angle sensor), an accelerator sensor 20, a shift sensor 21, a wheel-speed sensor 22, an acceleration sensor 26 and others in addition to the surroundings-monitoring ECU 14, the monitor 11, the front wheel steering system 12, and the rear wheel steering system 13. These components are electrically connected with one another via an in-vehicle network 23 (an electric communication line). Examples of the in-vehicle network 23 include a controller area network (CAN). The surroundings-monitoring ECU 14 transmits a control signal via the in-vehicle network 23 and controls the front wheel steering system 12, the rear wheel steering system 13, the brake system 18, and others. Furthermore, the surroundings-monitoring ECU 14 can receive detection results from a torque sensor 12b, a tire angle sensor 13b (for the rear wheels 3R), a brake sensor 18b, the rudder angle sensor 19 (for the front wheels 3F), the accelerator sensor 20, the shift sensor 21, the wheel-speed sensor 22, the acceleration sensor 26, and others and can further receive an instruction signal (a control signal, an operation signal, an input signal, and data) from the operation input unit 10 and others via the in-vehicle network 23.

In the embodiment, the vehicle 1 has two acceleration sensors 26 (26a and 26b). In the embodiment, furthermore, the vehicle 1 is a vehicle mounting an electronic stability control (ESC), and uses the acceleration sensors 26 (26a and 26b) conventionally mounted on ESC mounting vehicles. The embodiment is not intended to limit the kind of acceleration sensor, and such a sensor may be applicable that can detect acceleration in the lateral direction of the vehicle 1. The acceleration sensors 26 in the embodiment derive acceleration in the longitudinal direction and the lateral direction.

The surroundings-monitoring ECU 14 includes, as an exemplary configuration, a central processing unit (CPU) 14a, a read only memory (ROM) 14b, a random access memory (RAM) 14c, a display control unit 14d, a sound control unit 14e, a solid state drive (SSD) 14f (a flash memory), and others. The CPU 14a performs image processing relating to images displayed on the display device 8 and performs various kinds of calculation processing including calculation of a travel route of the vehicle 1 and determination about whether the vehicle interferes with an object. The CPU 14a reads out a computer program stored (installed) in a non-volatile memory device such as the ROM 14b and performs calculation processing according to the computer program.

The RAM 14c transitorily stores various kinds of data used for calculation performed by the CPU 14a. Among calculation processing performed by the surroundings-monitoring ECU 14, the display control unit 14d mainly performs image processing using image data obtained by the imaging unit 16 and image processing (such as image composition) on image data displayed on the display device 8. The sound control unit 14e mainly performs processing on sound data output from the sound output device 9 among calculation processing performed by the surroundings-monitoring ECU 14. The SSD 14f is a non-volatile rewritable memory unit and is capable of storing therein data even when the power supply of the surroundings-monitoring ECU 14 is turned off. The CPU 14a, the ROM 14b, the RAM 14c, and others can be integrated in the same package. The surroundings-monitoring ECU 14 may be configured with another logical operation processor such as a digital signal processor (DSP), a logical circuit, or the like instead of the CPU 14a. Moreover, a hard disk drive (HDD) may replace the SSD 14f. The SSD 14f and the HDD may be provided separately from the surroundings-monitoring ECU 14.

Figure 4:
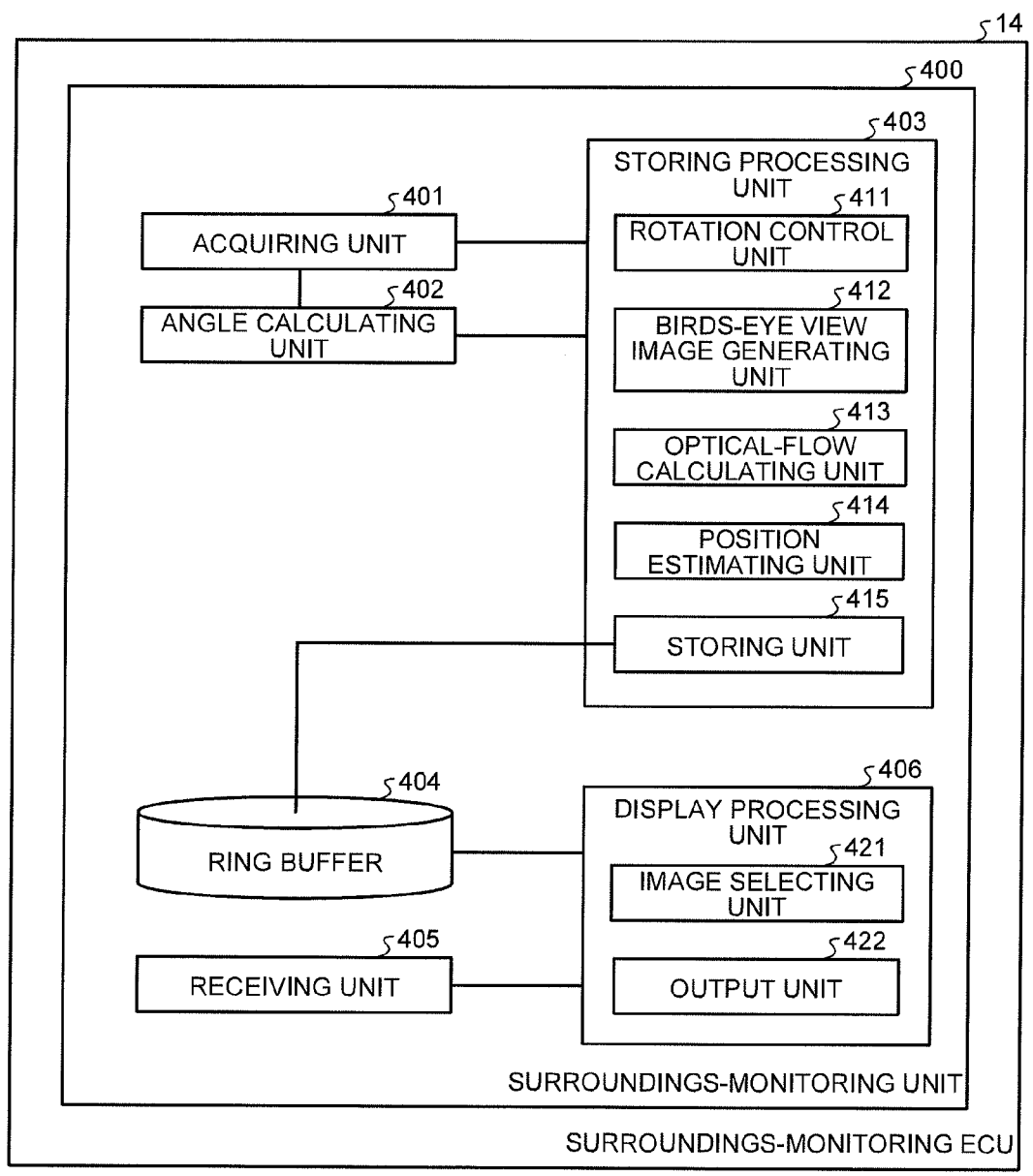
FIG. 4 is a block diagram that illustrates the configuration of a surroundings-monitoring unit implemented in a surroundings-monitoring ECU according to the first embodiment.

FIG. 4 is a block diagram that illustrates the configuration of a surroundings-monitoring unit 400 implemented in the surroundings-monitoring ECU 14 according to the embodiment. The CPU 14a provided in the surroundings-monitoring ECU 14 in FIG. 3 executes software stored in the ROM 14b (a computer-readable memory medium), thereby implementing an acquiring unit 401, an angle calculating unit 402, a storing processing unit 403, a receiving unit 405, and a display processing unit 406 illustrated in FIG. 4. The software (computer program) may be embedded in another computer-readable memory medium and provided. The surroundings-monitoring unit 400 implements a ring buffer 404 on the RAM 14c.

Figure 5:
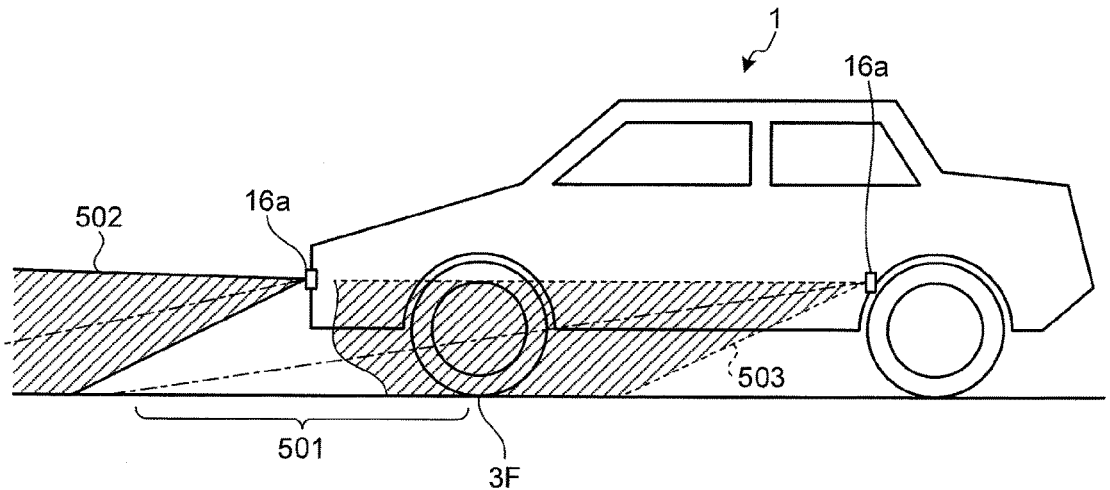
FIG. 5 is a drawing that illustrates an area imaged by an imaging unit of the vehicle according to the first embodiment.

FIG. 5 is a drawing that illustrates an area imaged by the imaging unit 16a of the vehicle 1 according to the embodiment. As illustrated in FIG. 5, the imaging unit 16a images a road surface in a forward direction of the vehicle 1 and an area extending upward (the opposite direction to the gravity direction) from the road surface and including at least the horizon. A road surface 501 around the front wheels 3F of the vehicle 1, however, is not included in an imaged area 502 where the imaging unit 16a is imaging at the actual moment. It is difficult to extend the imaged area to the underfloor area near the front wheels 3F because of the positional relation with a bumper of the vehicle 1 and the like (because of structural issues of the vehicle 1).

The driver thus has difficulty in checking whether any obstacles exist around the front wheels 3F of the vehicle 1 even though the driver visually checks captured image data being currently imaged. Upon a request from a driver, the surroundings-monitoring unit 400 according to the embodiment is capable of displaying captured image data having been previously imaged by the imaging unit 16a. The captured imaged data having been previously imaged means captured image data having been imaged from a backward position from the current position of the vehicle 1.

For example, the surroundings-monitoring unit 400 may present the driver with captured image data of an imaged area 503 as captured image data having been imaged by the imaging unit 16a from a backward position of the vehicle 1. Because the imaged area 503 includes the road surface 501, the driver can check the road surface 501 around the front wheels 3F. This configuration enables the driver to drive the vehicle 1 by checking the condition of the road surface 501 and thus reduces stress of driving. The configuration of the surroundings-monitoring unit 400 will now be described with reference back to FIG. 4.

The acquiring unit 401 acquires various kinds of information from various kinds of sensors and others installed to the vehicle 1. The acquiring unit 401 according to the embodiment acquires captured image data output from the imaging units 16a to 16d installed to the vehicle 1 and imaging the peripheral area of the vehicle 1 and acquires acceleration data output from the acceleration sensors 26a and 26b installed to the vehicle 1. The acquiring unit 401 outputs the acquired information to the angle calculating unit 402 and the storing processing unit 403.

The acquiring unit 401 associates captured image data and acceleration data with each other in which the time of imaging and the time of detection of acceleration are substantially matched.

The angle calculating unit 402 calculates the inclination angle (the pitch angle and the roll angle) of the vehicle 1 based on the acceleration data obtained by the acceleration sensors 26a and 26b. The pitch angle denotes an angle indicating the inclination around the lateral axis of the vehicle 1, and the roll angle denotes an angle indicating the inclination around the longitudinal axis of the vehicle 1.

The angle calculating unit 402 associates the roll angle and the pitch angle calculated based on the acceleration data with captured image data associated with the acceleration data. This process makes it possible to recognize the roll angle and the pitch angle of the vehicle 1 at the time of imaging the captured image data.

The storing processing unit 403 includes a rotation control unit 411, a birds-eye view image generating unit 412, an optical-flow calculating unit 413, a position estimating unit 414, and a storing unit 415. The storing processing unit 403 generates captured image data to be displayed on the display device 8 and stores the data.

The rotation control unit 411 performs rotation correction on captured image data in which the peripheral area in front (a forward direction) of the vehicle 1 has been imaged by the imaging unit 16a.

The rotation control unit 411 according to the embodiment performs rotation correction using positional coordinates, as the origin, in the display area of the captured image data, the coordinates corresponding to the center of a lens used by the imaging unit 16a for imaging, based on the roll angle associated with the captured image data. The object of the rotation correction is not limited to captured image data imaged by the imaging unit 16a. The rotation correction may be performed, for example, on captured image data in which a backward peripheral area of the vehicle 1 has been imaged by the imaging unit 16c.

Based on the rotation-controlled captured image data, the birds-eye view image generating unit 412 generates birds-eye view image data that presents the ground around the vehicle 1 and extending in a forward direction of the vehicle 1 viewed from above. Any methods are applicable for generating birds-eye view image data from captured image data. Examples of the method may include conversion using a mapping table.

Birds-eye view image data is generated each time captured image data is acquired. In other words, the birds-eye view image generating unit 412 generates first birds-eye view image data based on first captured image data having undergone the rotation control of the rotation control unit 411. When the vehicle 1 travels a distance after the first captured image data has been photographed, the birds-eye view image generating unit 412 generates second birds-eye view image data based on second captured image data having been imaged by the imaging unit 16 and having undergone the rotation control of the rotation control unit 411.

The optical-flow calculating unit 413 calculates an optical flow based on the birds-eye view image data calculated by the birds-eye view image generating unit 412. The optical flow denotes information indicating a movement of an object captured in birds-eye view image data with a vector, and the amount of travel of the vehicle 1 can be estimated by calculating the optical flow.

The optical-flow calculating unit 413 according to the embodiment compares birds-eye view image data generated by the birds-eye view image generating unit 412 with birds-eye view image data used in the last update and calculates an optical flow.

However, comparing the whole part of the birds-eye view image data increases the load of processing. The optical-flow calculating unit 413 according to the embodiment thus compares a predetermined area in birds-eye view image data generated by the birds-eye view image generating unit 412.

In specific, the optical-flow calculating unit 413 according to the embodiment cuts out a predetermined area (a display range) from each of the first birds-eye view image data used in the last update and the second birds-eye view image data generated after the first birds-eye view image data and calculates an optical flow.

Figure 6A:
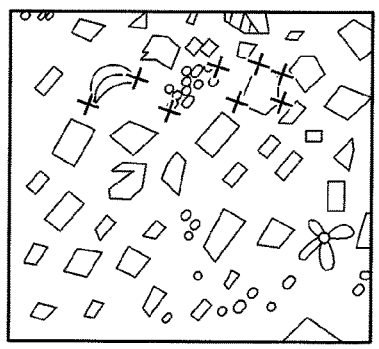
FIGS. 6(A) to 6(C) are drawings that illustrate the concept of an optical flow calculated by an optical-flow calculating unit according to the first embodiment.
Figure 6B:
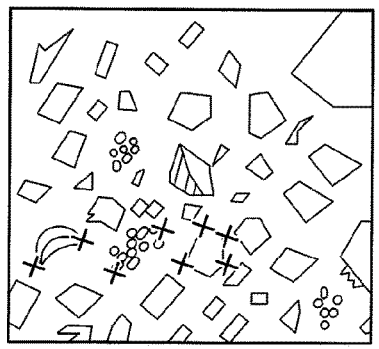

FIG. 6 is a drawing that illustrate the concept of an optical flow calculated by the optical-flow calculating unit 413. FIG. 6(A) illustrates image data in a predetermined display range cut out from the first birds-eye view image data used in the last update. FIG. 6(B) illustrates image data in a predetermined display range cut out from the second birds-eye view image data generated this time by the birds-eye view image generating unit 412.

Figure 6C:
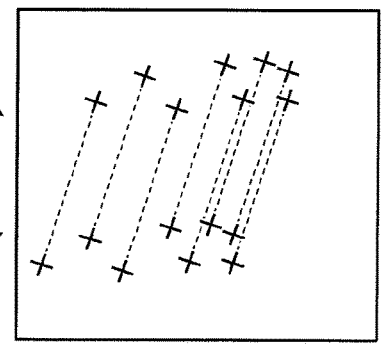

The optical-flow calculating unit 413 calculates an optical flow indicating, with a vector, the transition of a displayed object (a characteristic point thereof) from the image data illustrated in FIG. 6(A) to the image data illustrated in FIG. 6(B). FIG. 6(C) illustrates an example of the calculated optical flow. The example illustrated in FIG. 6(C) illustrates the length of a vector in which a characteristic point (indicated as "x") illustrated in FIG. 6(A) moves to another characteristic point (indicated as "x") illustrated in FIG. 6(B).

The position estimating unit 414 thereafter calculates the amount of travel of the vehicle 1 based on the average value of the optical flows calculated by the optical-flow calculating unit 413 and estimates the current position of the vehicle 1.

In the embodiment, the current position of the vehicle 1 is estimated with an optical flow. This is because the vehicle 1 is often traveling off road when the driver hopes to perceive the underfloor conditions of the vehicle 1 such as conditions around the front wheels 3F of the vehicle 1. In off-road travel, the wheels 3 are likely to spin free due to a rough road surface and the like. Under such a circumstance, an error may be caused if the amount of travel of the vehicle 1 is estimated based on the number of rotations of the wheels 3. In the embodiment, the amount of travel and the position of the vehicle 1 are therefore estimated based on the optical flow.

The storing unit 415 stores captured image data having undergone the rotation control of the rotation control unit 411 in the ring buffer 404 together with positional information of the vehicle 1 if either one of conditions is satisfied that the amount of travel of the vehicle 1 from the last storing becomes equal to or larger than a certain distance and the traveling angle of the vehicle 1 is equal to or larger than a certain angle. The embodiment is not intended to limit the certain distance; however, as an example, the certain distance may be 0.3 meters, 0.5 meters, or the like. The certain angle may be two degrees, for example.

The ring buffer 404 stores therein current captured image data output from the imaging unit 16a in such a manner that associates the captured image data with information at the time of capturing. FIG. 7 is a drawing that illustrates the configuration of the ring buffer 404. As illustrated in FIG. 7, the ring buffer 404 stores therein captured image data in such a manner that associates the captured image data with the inclination (in the forward direction) and the positional information of the vehicle 1 at the time of capturing the image data.

As illustrated in FIG. 7, the ring buffer 404 denotes a buffer logically arranged in a ring shape. Upon a request for storing from the storing unit 415, the ring buffer 404 overwrites its oldest updated area with the captured image data and the like to be stored according to the request from the storing unit 415 and stores the overwritten data.

The receiving unit 405 receives an instruction signal (a control signal) from the operation input unit 10 and others. The receiving unit 405 according to the embodiment receives a switch operation that switches captured image data to be displayed on the display device 8 between the current captured image data having been imaged by the imaging unit 16a and the previous captured image data (in other words, the underfloor display of the vehicle 1) stored in the ring buffer 404.

The display processing unit 406 has an image selecting unit 421 and an output unit 422 and performs display processing on the display device 8 according to an operation received by the receiving unit 405.

Figure 8:
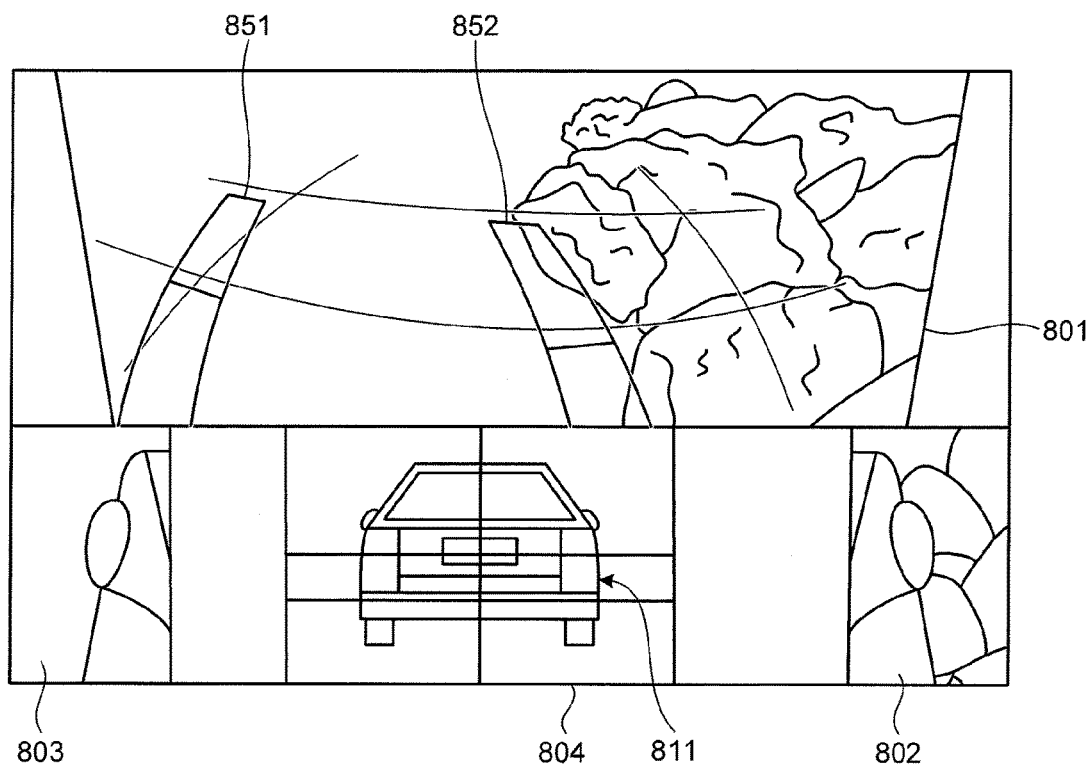
FIG. 8 is a drawing that illustrates an example of a standard screen on which display processing has been performed by a display processing unit according to the first embodiment.

FIG. 8 is a drawing that illustrates an example of a standard screen on which display processing has been performed by the display processing unit 406. As FIG. 8 illustrates, an exemplary standard screen displays thereon captured image data 801 imaged by the imaging unit 16a, captured image data 802 imaged by the imaging unit 16d and indicating the peripheral area of the right front wheel 3F of the vehicle 1, and captured image data 803 imaged by the imaging unit 16b and indicating the peripheral area of the left front wheel 3F of the vehicle 1. Furthermore, the pitch angle and the roll angle of the vehicle 1 are displayed on a display area 804 as recognizable information. In specific, the roll angle is indicated with inclination of an icon 811 representing the vehicle 1 whereas the pitch angle is indicated with the distance between the center line penetrating the icon 811 and the horizontal line. In the embodiment, the roll angle and the pitch angle are recognizably indicated in such a display mode; however, the embodiment is not intended to limit the display mode, and other display modes are also applicable.

The captured image data 801 displays trajectories 851 and 852 that indicate the traveling directions of the front wheels 3F based on the steering angle acquired from the rudder angle sensor 19. This configuration enables the driver to drive the vehicle 1 with understanding of a traveling direction of the vehicle 1.

However, with an example of the screen illustrated in FIG. 8, it is difficult to understand the conditions around the underfloor area of the vehicle 1. The surroundings-monitoring unit 400 according to the embodiment can thus switch the display to the underfloor and its peripheral area of the vehicle 1. The embodiment is not intended to limit the method for switching the display; however, as an example, the display processing unit 406 may switch the display when the receiving unit 405 receives pressing of a display switch button after the vehicle 1 has stopped.

Figure 9:
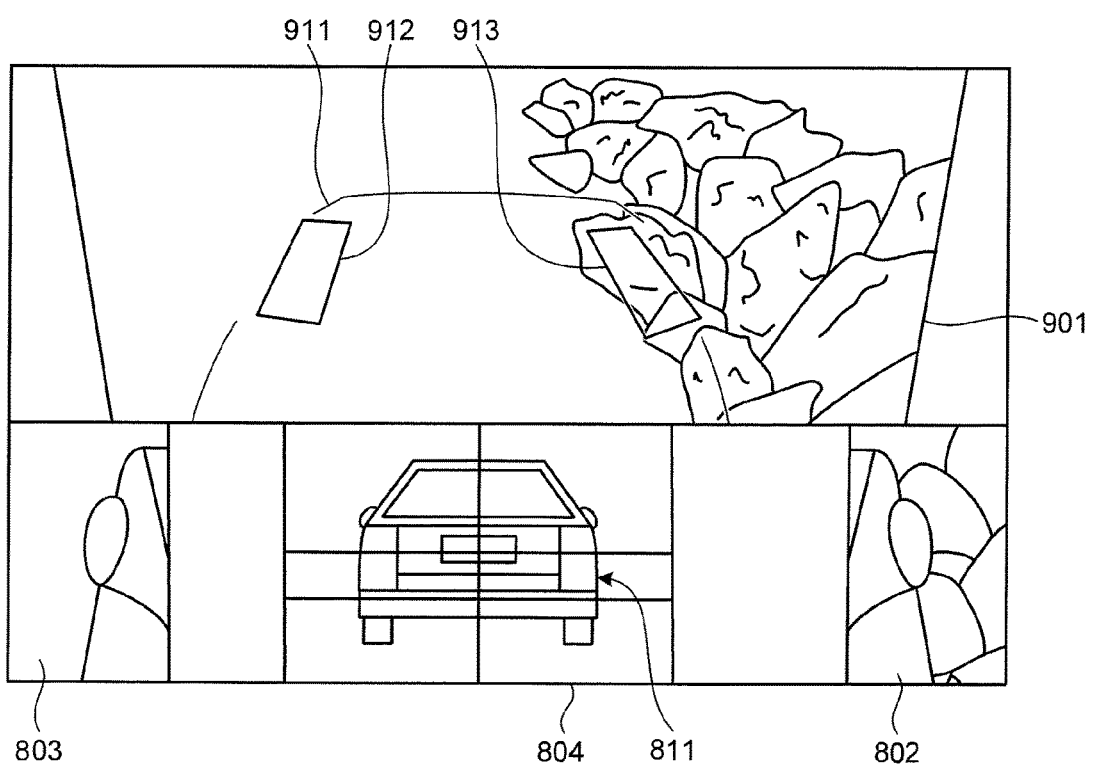
FIG. 9 is a drawing that illustrates an example of an underfloor display screen on which display processing has been performed by the display processing unit according to the first embodiment.

FIG. 9 is a drawing that illustrates an example of an underfloor display screen on which display processing has been performed by the display processing unit 406. In the example illustrated in FIG. 9, the captured image data 802 displaying the peripheral area of the right front wheel 3F, the captured image data 803 displaying the peripheral area of the left front wheel 3F, and the display area 804 recognizably displaying the roll angle and the pitch angle represent the conditions of the current vehicle 1. These components are thus the same as those illustrated in FIG. 8.

Captured image data 901 denotes captured image data previously imaged by the imaging unit 16a of the vehicle 1. The position of the current vehicle 1 on the captured image data 901 can be estimated based on the calculated amount of travel of the vehicle 1 from the time of imaging the captured image data 901. The display processing unit 406 displays information from which a specific part of the current vehicle 1 is identifiable. In the example illustrated in FIG. 9, an outline 911 representing the outer shape of the vehicle 1 and outlines 912 and 913 representing the outer shapes of the respective front wheels 3F of the vehicle 1 are displayed as an example of identification information from which a specific part of the vehicle 1 is identifiable.

The outlines 912 and 913 indicating the outer shapes of the respective front wheels 3F denote outlines drawn based on the current steering angle detected by the rudder angle sensor 19. With this configuration, the driver can understand the current directions and positions of the tires of the vehicle 1 by visually checking the outlines 912 and 913. The outline 911 indicating the outer shape of the vehicle 1 and the outlines 912 and 913 indicating the outer shapes of the respective front wheels 3F are superimposed on the captured image data 901. This configuration enables the driver to understand the conditions of the road surface and the underfloor road surface including the peripheral areas of the front wheels 3F of the vehicle 1. The surroundings-monitoring unit 400 can therefore provide driving environments that can help the driver, for example, avoid obstacles existing around the front wheels 3F. The embodiment thus can reduce stress of driving and accordingly make driving more convenient.

Information superimposed on captured image data is not limited to identification information (such as the outlines 911, 912, and 913) from which a specific part of the vehicle 1 is identifiable. For example, the display processing unit 406 according to the embodiment may display, upon a request from the driver, a trajectory or the like of the vehicle 1 traveling in a direction based on the current steering angle of the vehicle 1 on the captured image data.

Referring back to FIG. 4, the configuration of the display processing unit 406 will now be described. When the receiving unit 405 receives a switch to the underfloor display, the image selecting unit 421 selects captured image data to be displayed from among the captured image data stored in the ring buffer 404.

The image selecting unit 421 according to the embodiment selects captured image data having been previously imaged by the imaging unit 16a and including a road surface corresponding to the current vehicle 1 from the ring buffer 404. In other words, an underfloor display of the vehicle 1 is made by displaying captured image data including a road surface estimated to be (corresponding to) the position of the current vehicle 1 on the road surface that is being imaged.

Figure 10:
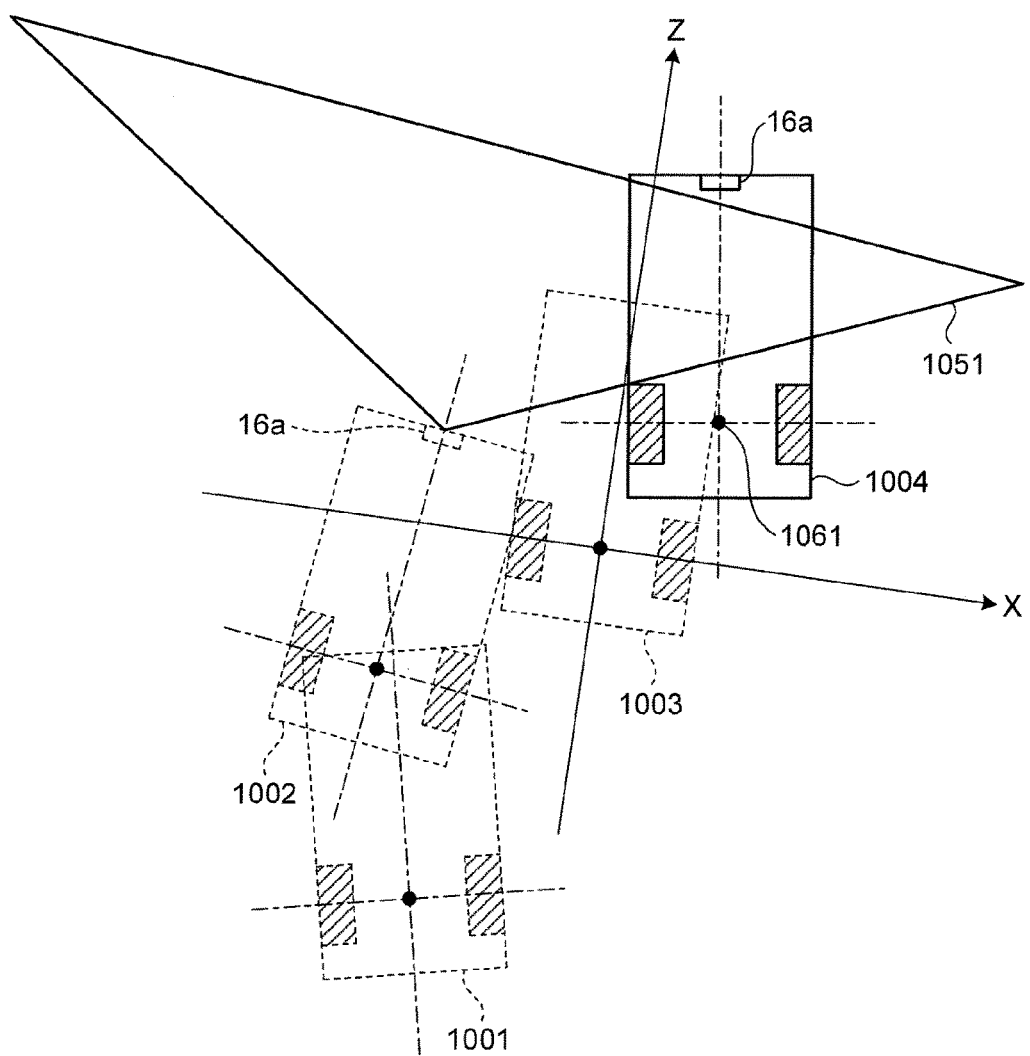
FIG. 10 is a drawing for explaining captured image data selected by an image selecting unit according to the first embodiment.

FIG. 10 is a drawing for explaining captured image data selected by the image selecting unit 421 according to the embodiment. In the example illustrated in FIG. 10, the vehicle 1 sequentially moves to positions 1001, 1002, 1003, and 1004 and is currently positioned at the position 1004. The vehicle 1 receives a switch to the underfloor display from the driver at the position 1004.

In this case, the image selecting unit 421 according to the embodiment selects captured image data to be displayed from among the captured image data stored in the ring buffer 404 with a center 1061 between the rear wheels 3R of the current vehicle 1 as a reference point. In the embodiment, the image selecting unit 421 selects captured image data satisfying conditions that the position of the imaging unit 16a at the time of photographing the captured image data is close to the center 1061 or behind the center 1061 and the inclination (a forward direction) of the vehicle 1 at the time of photographing the captured image data is within a certain angular range with respect to the traveling direction of the current vehicle 1. As a position satisfying the conditions, the image selecting unit 421 selects captured image data having been imaged from the position 1002. An imaged area 1051 of the captured image data having been imaged from the position 1002 includes the road surface around the front wheels 3F of the current vehicle 1. The display processing unit 406 superimposes an outline indicating the position of the current vehicle 1 on the captured image data, whereby the driver can understand the conditions of the road surface around the front wheels 3F of the current vehicle 1.

The embodiment is not intended to limit a method for selecting captured image data to the above-described method, and other methods may also be applicable. For example, the image selecting unit 421 may select captured image data, which has inclination (a forward direction) of the vehicle 1 falling within a certain angular range with respect to the traveling direction of the current vehicle 1 and is the oldest among the captured image data stored in the ring buffer 404.

The output unit 422 outputs captured image data selected by the image selecting unit 421 to the display device 8 when the output unit 422 receives selection of the underfloor display. With this process, the output unit 422 can output, to the display device 8, captured image data that has been previously imaged by the imaging unit 16a and includes an area where the current vehicle 1 is positioned, from among the captured image data stored in the ring buffer 404. The output unit 422 further outputs, to the display device 8, the captured image data 802 including the peripheral area of the right front wheel 3F, the captured image data 803 including the peripheral area of the left front wheel 3F of the vehicle 1, and the display area 804 recognizably displaying the roll angle and the pitch angle.

Figure 11:
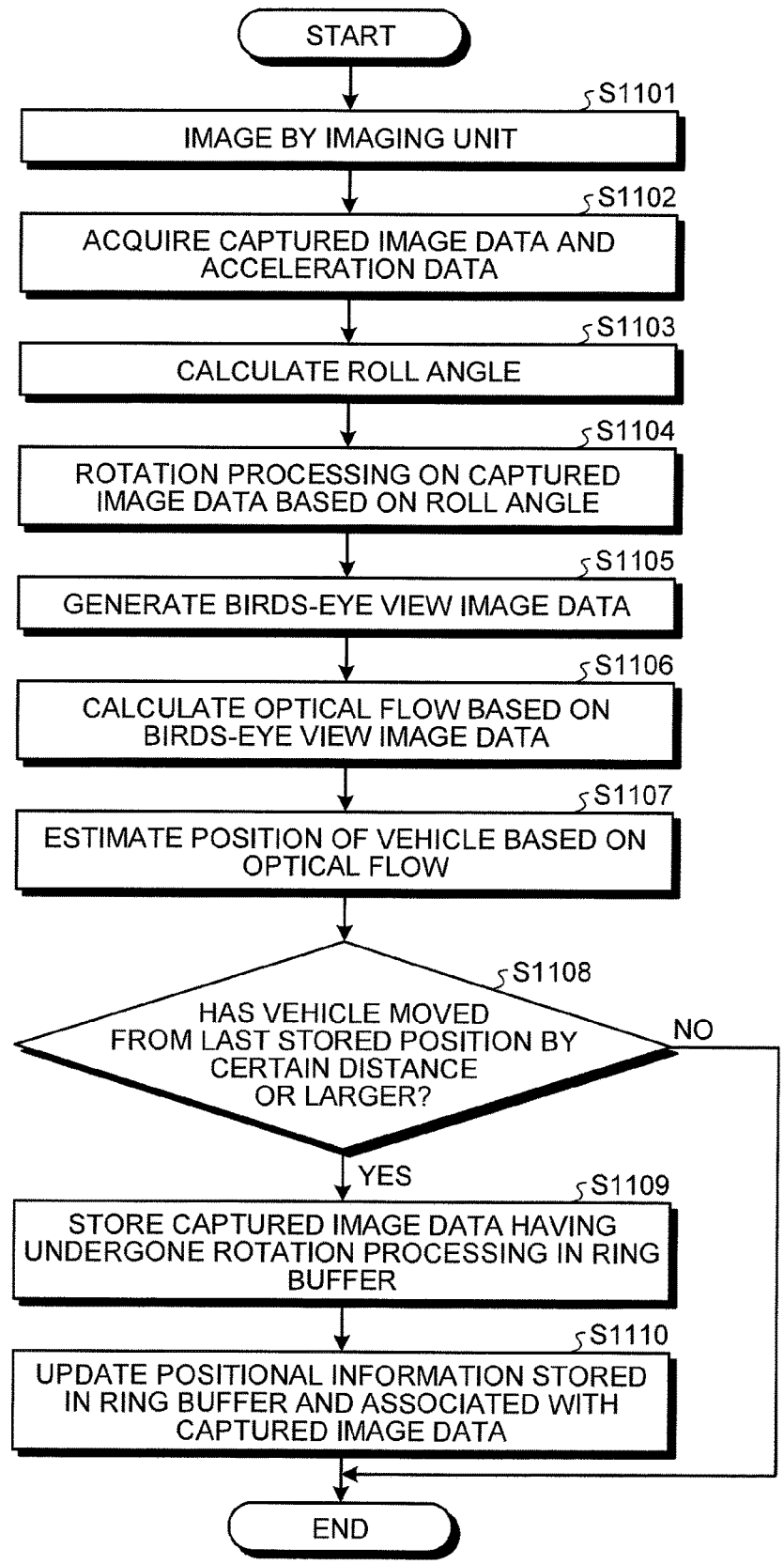
FIG. 11 is a flowchart that illustrates a procedure of captured image data storing processing performed by the surroundings-monitoring unit according to the first embodiment.

The storing processing on captured image data performed by the surroundings-monitoring unit 400 according to the embodiment will now be described. FIG. 11 is a flowchart that illustrates a procedure of the above-described processing performed by the surroundings-monitoring unit 400 according to the embodiment.

The imaging unit 16 images an image of the surroundings of the vehicle 1 (Step S1101). In particular, the imaging unit 16a images an image of an area including a road surface and the horizon in a forward direction of the vehicle 1.

The acquiring unit 401 acquires captured image data from the imaging unit 16 and acceleration data from the acceleration sensor 26 (Step S1102).

The angle calculating unit 402 calculates the roll angle and the pitch angle of the vehicle 1 from the acceleration data (Step S1103).

The rotation control unit 411 performs rotation control on the captured image data based on the roll angle (Step S1104).

The birds-eye view image generating unit 412 generates, from the rotation-controlled captured image data, birds-eye view image data indicating a specific area existing around the vehicle 1 in the forward direction of the vehicle 1 in an overhead view (Step S1105).

The optical-flow calculating unit 413 calculates an optical flow based on the generated birds-eye view image data (Step S1106).

Based on the calculated optical flow, the position estimating unit 414 calculates the amount of travel of the vehicle 1 and estimates the current position of the vehicle 1 (Step S1107).

The storing unit 415 determines whether the position of the vehicle 1 has been changed from the last stored position by at least one of a certain distance (such as 0.3 meters and 0.5 meters) or larger and a certain angle (such as two degrees) or larger (Step S1108). If the storing unit 415 determines that the position of the vehicle 1 has not been changed by either the certain distance or the certain angle (No at Step S1108), the storing unit 415 ends the processing. The embodiment is described with an example where the storing unit 415 stores data when the position of the vehicle 1 has been changed by at least one of a certain distance or larger and a certain angle or larger; however, the embodiment is not limited to such a method of storing. The storing unit 415 may store data at each certain time.

If the storing unit 415 determines that the position of the vehicle 1 has been changed from the last stored position by at least one of the certain distance (such as 0.3 meters and 0.5 meters) or larger and the certain angle or larger (Yes at Step S1108), the storing unit 415 overwrites the oldest updated area in the ring buffer 404 with current captured image data having undergone the rotation control and stores the overwritten data (Step S1109). At this time, the storing unit 415 stores the captured image data together with the inclination (the forward direction) and the positional information at the time of imaging the captured image data in an associated manner.

The storing unit 415 thereafter updates the positional information of the captured image data, which is based on the time of imaging the captured image data and stored in the ring buffer 404, with positional information based on the current position as a reference point (the origin) (Step S1110). With this update, positional information can be continuously retained without overflowing the ring buffer 404.

In this manner, the surroundings-monitoring unit 400 according to the embodiment can present the captured image data stored in the ring buffer 404 as image data for the underfloor display.

Figure 12:
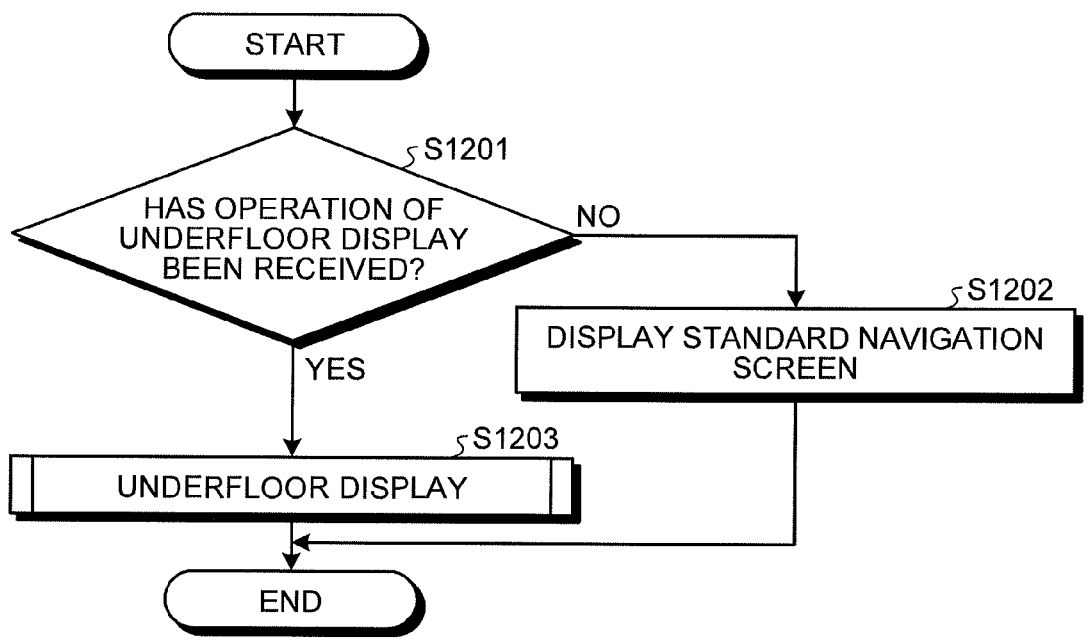
FIG. 12 is a flowchart that illustrates a procedure of display processing performed by the surroundings-monitoring unit according to the first embodiment.

Display processing performed by the surroundings-monitoring unit 400 according to the embodiment will now be described. FIG. 12 is a flowchart that illustrates a procedure of the above-described processing performed by the surroundings-monitoring unit 400 according to the embodiment.

The display processing unit 406 determines whether the receiving unit 405 has received an operation of the underfloor display (Step S1201). If the display processing unit 406 determines that the receiving unit 405 has not received an operation of the underfloor display (No at Step S1201), the display processing unit 406 displays a standard navigation screen (Step S1202).

If the display processing unit 406 determines that the receiving unit 405 has received an operation of the underfloor display (Yes at Step S1201), the display processing unit 406 performs underfloor display using the captured image data stored in the ring buffer 404 (Step S1203).

Figure 13:
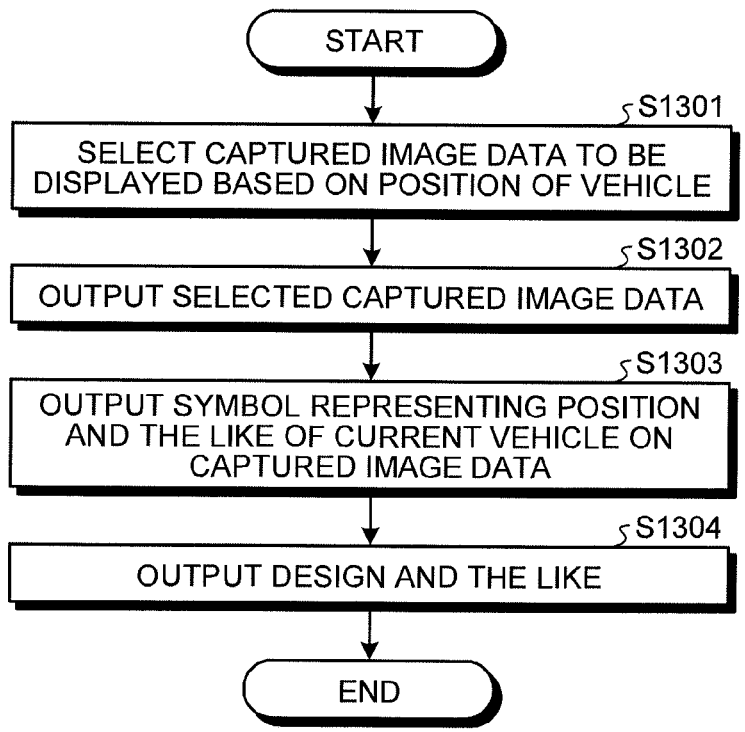
FIG. 13 is a flowchart that illustrates a procedure of underfloor display processing performed by the surroundings-monitoring unit according to the first embodiment.

The underfloor display performed at Step S1203 in FIG. 12 will now be described. FIG. 13 is a flowchart that illustrates a procedure of the above-described processing performed by the surroundings-monitoring unit 400 according to the embodiment.

The image selecting unit 421 selects captured image data to be displayed from the ring buffer 404 based on the position of the current vehicle 1 (Step S1301). Any of the methods as described earlier is applicable as a method for selecting captured image data, and description is thus omitted. The image selecting unit 421 according to the embodiment selects captured image data having an image of an area including the position of the current vehicle 1.

The output unit 422 outputs the captured image data selected by the image selecting unit 421 to the display device 8 (Step S1302).

The output unit 422 further outputs a symbol (such as the outline of the vehicle 1 and the outlines of the front wheels 3F of the vehicle 1) indicating the position and the like of the current vehicle 1 in such a manner that superimposes the symbol on the captured image data output at Step S1302 (Step S1303).

The output unit 422 further outputs a design and the like (including captured image data displaying the peripheral area of the right front wheel 3F, captured image data displaying the peripheral area of the left front wheel 3F of the vehicle 1, and a display area recognizably displaying the roll angle and the pitch angle) to be displayed on the display device 8 (Step S1304).

With the above-described processing procedure, such a screen is displayed on which an outline indicating the current position of the vehicle 1 is superimposed on captured image data having an image of an area including the position of the vehicle 1.

When the vehicle 1 moves after the output by the output unit 422, the output unit 422 changes (in animation display) the symbol (such as the outline of the vehicle 1 and the outlines of the front wheels 3F of the vehicle 1) indicating the position and the like of the vehicle 1 in synchronization with the move of the vehicle 1. This process enables the driver to realize the current position of the vehicle 1.

Furthermore, in the embodiment, when the position of the vehicle 1 is changed by at least one of the certain distance (such as 0.3 meters and 0.5 meters) or larger and the certain angle or larger after the output unit 422 has displayed previous captured image data, the image selecting unit 421 newly selects captured image data suitable for the position of the current vehicle 1 from the ring buffer 404, and the output unit 422 displays the selected captured image data. With this process, captured image data corresponding to the position of the vehicle 1 is displayed, and the driver can therefore easily understand the surroundings of the current vehicle 1.

In the embodiment, such an example is described that displays the captured image data stored in the ring buffer 404 and having undergone rotation processing. However, the embodiment is not intended to limit image processing only to rotation processing, and examples of image processing may include distortion correction, a view-point change, and shape correction.

In the embodiment, a blind area generated at the position of the current vehicle 1 can be displayed on the display device 8 by performing the above-described display processing on captured image data. This process enables the driver to understand the surroundings of the vehicle, which accordingly reduces stress of driving.

In the embodiment, such captured image data is displayed that has an image of an area including a road surface and the horizon, in other words, that has an oblique view point. Compared with displaying birds-eye view image data, this method further helps the driver understand the conditions of the road surface when driving on a bumpy road surface, that is, driving off road and thus reduces stress of driving.

In the embodiment, the position of the vehicle 1 is estimated based on a calculated optical flow. This method makes it possible to more accurately estimate the position of the vehicle 1 even when the wheels 3 spin free during off-road traveling.

In the above-described embodiment, the vehicle 1 has a plurality of imaging units 16a to 16d. In the above-described embodiment, it is therefore possible to compose image data having been captured by a plurality of imaging units from any position at the same time and display the composite image data. For example, it is possible to display composite image data generated from respective captured image data (such as captured image data having an image in the left direction, captured image data having an image in the front direction, and captured image data having an image in the right direction) having been photographed by the imaging unit 16a provided in the front direction and the imaging units 16b and 16d provided in the lateral direction.

In generating composite image data from a plurality of pieces of captured image data (captured image data having an image in the left direction, captured image data having an image in the front direction, and captured image data having an image in the right direction) having been photographed by the imaging unit 16a provided in the front direction and the imaging units 16b and 16d provided in the lateral direction, the pieces of captured image data have been imaged not from a plurality of positions of the vehicle 1 but from any (single) position of the vehicle 1. Furthermore, the pieces of captured image data do not need to be imaged at the same time as long as they are imaged from any position of the vehicle 1.

The above-described embodiment is not intended to limit an imaging position of the vehicle 1. As long as captured image data for the underfloor display output from the output unit 422 includes a road surface corresponding to the position of the current vehicle 1, the captured image data may be imaged from any position. Furthermore, in this case, the captured image data used for the underfloor display is captured image data having been imaged from any (single) position of the vehicle 1, and composite image data generated from a plurality of pieces of image data having been imaged from a plurality of positions is not used for the underfloor display. This configuration can reduce the load of processing.

In the embodiment, such an example has been described that a plurality of pieces of captured image data are stored in the ring buffer 404 and captured image data to be displayed is selected from among the pieces of captured image data. As another example, captured image data imaged the last time may only be displayed. In this case, only one piece of captured image data is stored, and memory capacity can be therefore reduced.

In the embodiment, such an example has been described that switches the display by pressing a display switch button; however, the embodiment is not intended to limit the timing for switching the display. For example, previously imaged captured image data may be constantly displayed during travel of the vehicle. As another example, the display may be switched to previously imaged captured image data in response to a stop of the vehicle 1.

Second Embodiment

In the first embodiment, such an example has been described that estimates the position of the vehicle 1 based on an optical flow. However, the first embodiment is not intended to limit the method for estimating the position to the use of an optical flow. Such a sensor may be used that detects the number of rotations of the wheels 3 and estimates the amount of travel. In a second embodiment, an example will be described where the amount of travel is estimated based on the number of rotations of the wheels 3.

In the first embodiment, such an example has been described that displays captured image data imaged by the imaging unit 16a installed in the forward direction side when the vehicle moves forward. However, the first embodiment is not intended to limit the vehicle to the case of moving forward. Captured image data previously imaged by the imaging unit 16c may be displayed when the vehicle is moving backward.

Figure 14:
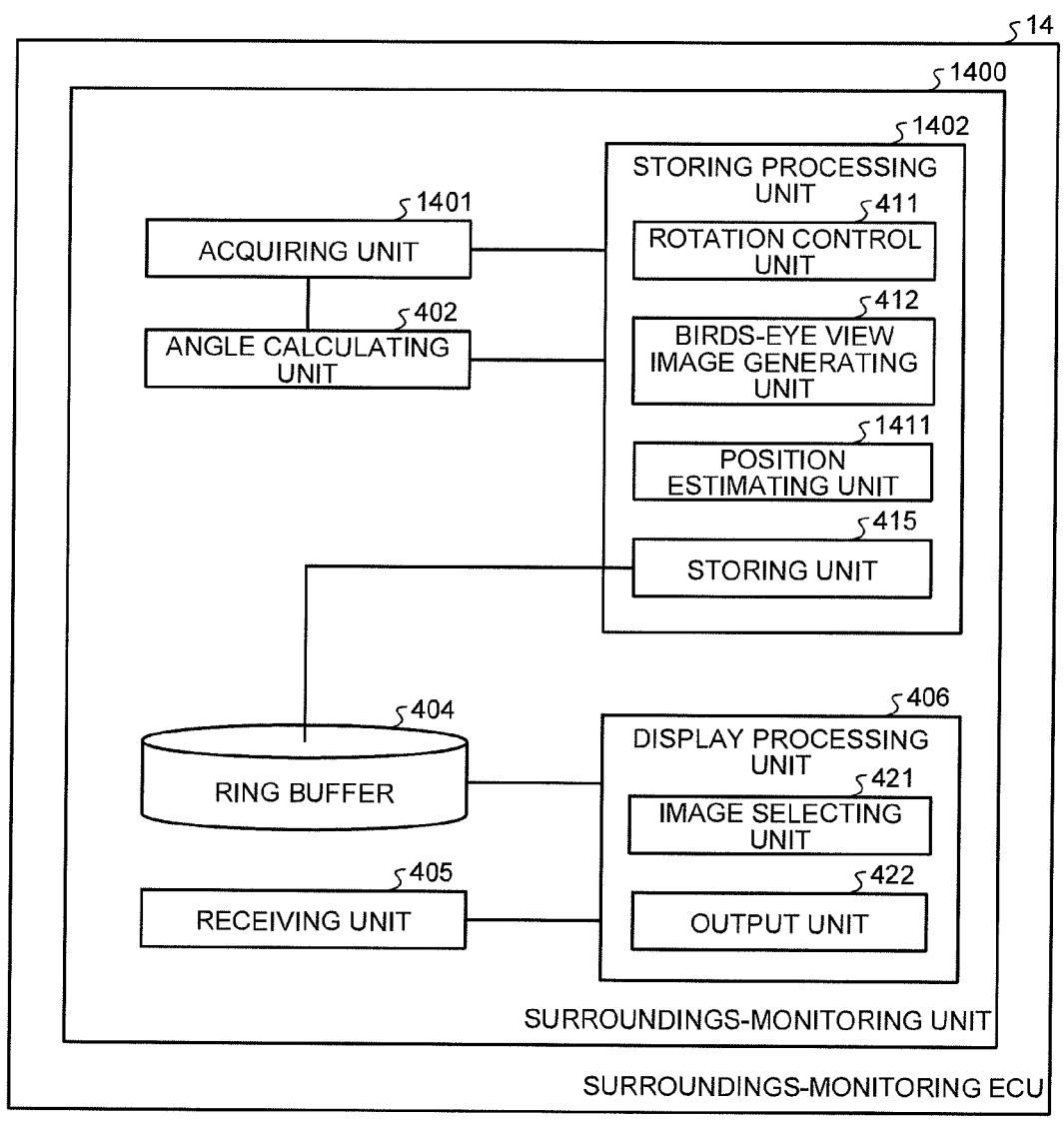
FIG. 14 is a block diagram that illustrates the configuration of a surroundings-monitoring unit implemented in a surroundings-monitoring ECU according to a second embodiment.

FIG. 14 is a block diagram that illustrates the configuration of a surroundings-monitoring unit 1400 implemented in the surroundings-monitoring ECU 14 according to the second embodiment. As FIG. 14 illustrates, the surroundings-monitoring unit 1400 has an acquiring unit 1401 performing different processing from that of the acquiring unit 401 of the first embodiment and a storing processing unit 1402 performing different processing from that of the storing processing unit 403 of the first embodiment. Like numerals indicate like components described in the first embodiment, and description of these components will be omitted in the following description.

The acquiring unit 1401 acquires, similarly with the first embodiment, captured image data and acceleration data and further acquires the speed of the wheels 3 from the wheel-speed sensor 22, that is, the number of rotations of the wheels 3 per certain time. The acquired speed and the number of rotations of the wheels 3 are output to the storing processing unit 1402.

The storing processing unit 1402 includes the rotation control unit 411, the birds-eye view image generating unit 412, a position estimating unit 1411, and the storing unit 415. The storing processing unit 1402 generates captured image data to be displayed on the display device 8 and stores the captured image data.

The position estimating unit 1411 estimates the position of the vehicle 1 based on the number of rotations, which is input from the acquiring unit 1401 and counted from the last estimation of a position, and the steering angle input from the rudder angle sensor 19.

The storing unit 415 thereafter stores, in the ring buffer 404, the captured image data in such a manner that associates with the inclination (the forward direction) and positional information of the current vehicle 1.

In the embodiment, the position of the vehicle 1 is estimated based on the number of rotations. This configuration makes it possible to accurately detect the position of the vehicle 1 traveling on road. Furthermore, the surroundings-monitoring unit 1400 according to the embodiment may display previous captured image data when the vehicle 1 is moving backward.

Figure 15:
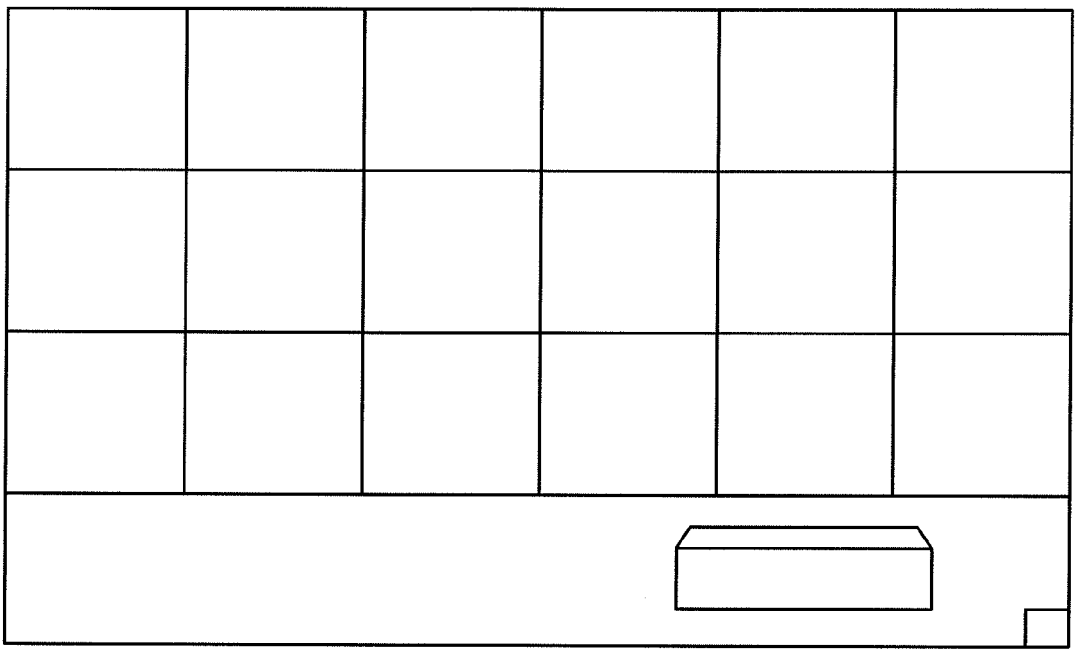
FIG. 15 is a drawing that illustrates an example of a standard screen on which display processing has been performed by a display processing unit according to the second embodiment when a vehicle is moving in reverse.

FIG. 15 is a drawing that illustrates an example of a standard screen on which display processing has been performed by the display processing unit 406 when the vehicle 1 is moving backward. As FIG. 15 illustrates, in an example of a standard screen, captured image data currently being imaged by the imaging unit 16c is displayed in a full-screen mode when the vehicle 1 is moving backward, so that the driver can check the surroundings of the vehicle 1. This configuration enables the driver to check the area behind the vehicle 1, which is difficult to check from the driver's seat. In the example illustrated in FIG. 15, however, it is difficult to estimate a distance interval in the area behind the vehicle 1. The surroundings-monitoring unit 1400 according to the embodiment can therefore switch to a display of an area around the underfloor space of the vehicle 1. For example, when the receiving unit 405 receives pressing of a display switch button, the display processing unit 406 switches the display.

Figure 16:
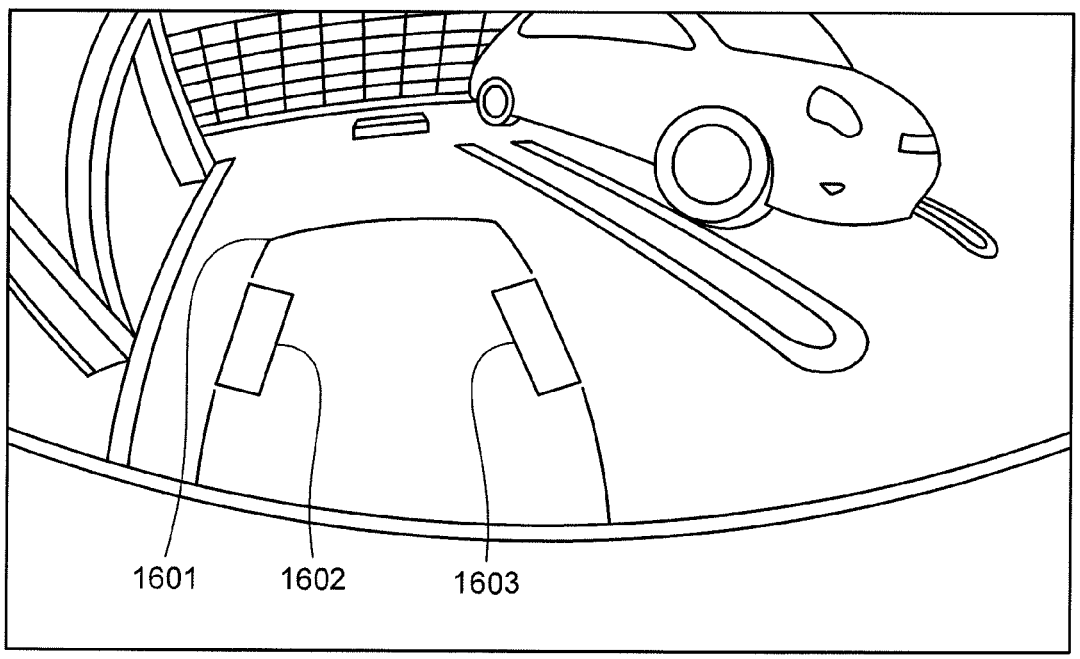
FIG. 16 is a drawing that illustrates an example of an underfloor display screen on which display processing has been performed by the display processing unit according to the second embodiment.

FIG. 16 is a drawing that illustrates an example of an underfloor display screen on which display processing has been performed by the display processing unit 406. In the example illustrated in FIG. 16, an outline 1601 indicating the outer shape of the current vehicle 1 and outlines 1602 and 1603 indicating the outer shapes of the respective rear wheels 3R of the vehicle 1 are superimposed on captured image data having been previously imaged by the imaging unit 16c.

The captured image data illustrated in FIG. 16 is captured image data selected by the image selecting unit 421 from among a plurality of pieces of captured image data having been imaged by the imaging unit 16c and stored in the ring buffer 404. The image selecting unit 421 can apply any method for selecting captured image data as long as captured image data including the current position of the vehicle 1 is selectable in a similar manner with the first embodiment.

In the captured image data illustrated in FIG. 16, the outline 1601 indicating a specific part of the current vehicle 1, for example, the position of the vehicle 1 itself, is superimposed on the previously imaged captured image data. This configuration enables the driver to understand the positional relation between the vehicle 1 and its surroundings. This configuration further enables the driver to check whether any obstacles and the like exist around the rear wheels 3R of the vehicle 1. If the vehicle 1 adopts a rear wheel steering system, display of the outlines 1602 and 1603 may be switched according to the tire angles of the rear wheels 3R.

The surroundings-monitoring unit 1400 according to the embodiment performs control based on a detection result obtained from a sensor estimating the amount of travel based on the number of rotations. In the embodiment, it is possible to accurately estimate the amount of travel in on-road driving.

In the embodiment, such an example has been described that calculates the amount of travel of the vehicle 1 based on the number of rotations of the wheels 3. The embodiment, however, is not limited to this method. As another example, the position and the amount of travel of the vehicle 1 may be detected with a global positioning system (GPS) and the like.

Third Embodiment

Figure 17:
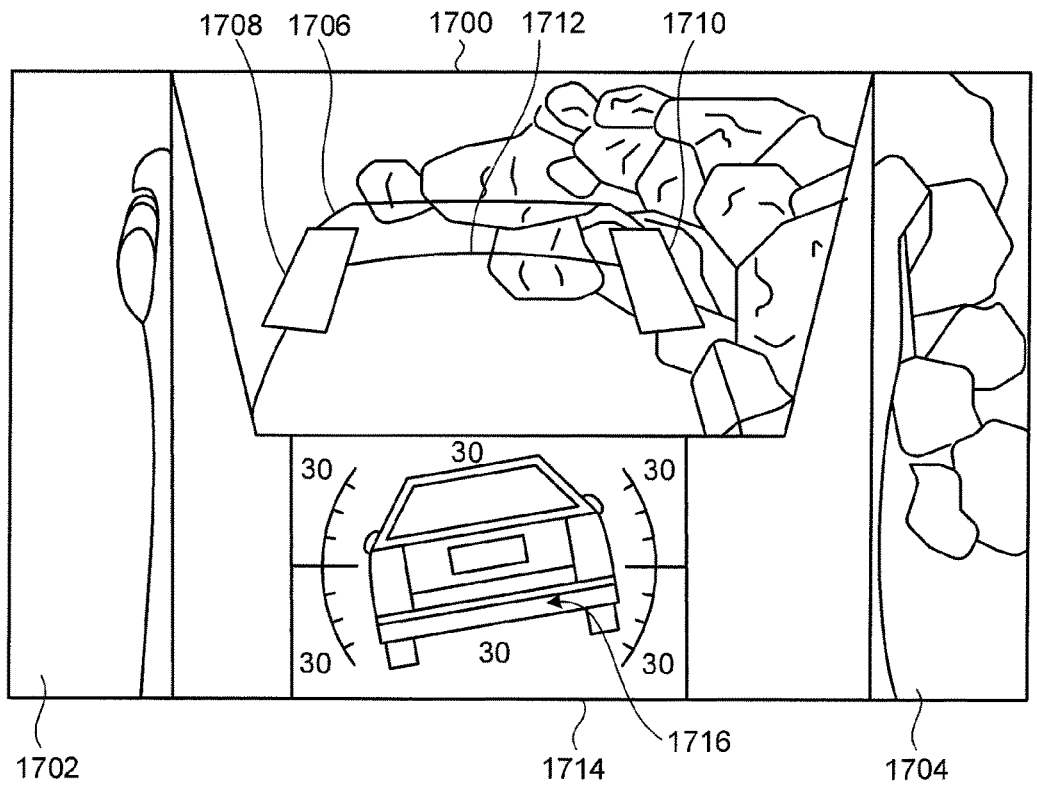
FIG. 17 is a drawing that illustrates an example of an underfloor display screen according to a third embodiment.

In the above-described first and second embodiments, such an example has been described that displays, for example, an outline indicating the outer shape of a vehicle and an outline indicating the outer shape of a wheel of the vehicle as identification information from which a specific part of the current vehicle 1 is identifiable. In a third embodiment illustrated in FIG. 17, different identification information is displayed. Furthermore, in the embodiment, such an example of display is indicated that has a different display mode from the above-described display mode in FIG. 9. With the display mode of FIG. 9, more than a half of full screen is used as a display area for displaying captured image data 901 in order to improve the visibility of the front image. In the case of FIG. 17, display areas (lateral display areas) for displaying captured image data 1702 and captured image data 1704 are extended frontward with respect to the display area (the front display area) of captured image data 1700 for easier understanding of the relation between the lateral images and the front image. This configuration accordingly enables the driver to easily understand the surroundings of the vehicle.

In the case of FIG. 17, similarly with the case of FIG. 9, an outline 1706 of the vehicle body for indicating the position of the current vehicle, an outline 1708 of the left front wheel, and an outline 1710 of the right front wheel are displayed on the captured image data 1700 having been previously photographed. In addition to that, an axle outline 1712 indicating the position of the axle is displayed as identification information indicating a specific part of the current vehicle. In this way, a specific part of the current vehicle, for example, the position at which an axle actually exists is superimposed on a previously photographed image indicating the surroundings of the vehicle. This configuration enables the driver to easily understand the surroundings, for example, relation between an obstacle such as a rock and the underfloor part of the vehicle. This configuration accordingly achieves more proper driving operation of the vehicle. Particularly in such a case where a projecting part such as an axle exists under the floor of the vehicle, superimposing the position on captured image data can facilitate such driving operation that prevents contact of underfloor parts with the road surface and the like or minimizes the damage caused by the contact. Furthermore, the driver can recognize the centers of the wheels indicated by the outlines 1708 and 1710 by displaying the axle outline 1712, which helps the driver correctly understand the ground contact positions of the wheels.

In FIG. 17, although the axle outline 1712 representing an axle is displayed as an example, another underfloor part may be displayed. For example, an outline representing the position of a differential gear may be displayed. This configuration also facilitates such driving operation that prevents the differential gear from contacting with the road surface and minimizes the damage caused by the contact. In addition to the outline 1706 of the vehicle body and the outlines 1708 and 1710 representing the wheels, the driver may select, as appropriate, an outline to be displayed such as the outline of an axle and the outline of a differential gear. The driver may have either one of the axle and the differential gear selectively displayed or may have both parts displayed. Likewise, underfloor parts other than the axle and the differential gear may be selectively displayed in a superimposed manner. With this process, the driver can easily understand the relation between the road surface and a specific part requiring caution of the driver when driving on a rough road, and more proper driving operation is thus achieved.

A display area 1714 displays therein an icon 1716 representing an inclined attitude (the pitch angle and the roll angle) of the vehicle. Additionally displaying the inclined attitude of the vehicle as a reference in driving can further facilitate such driving operation that prevents the axle and the differential gear from contacting with the road surface and minimizes the damage caused by the contact.

Fourth Embodiment

Figure 18:
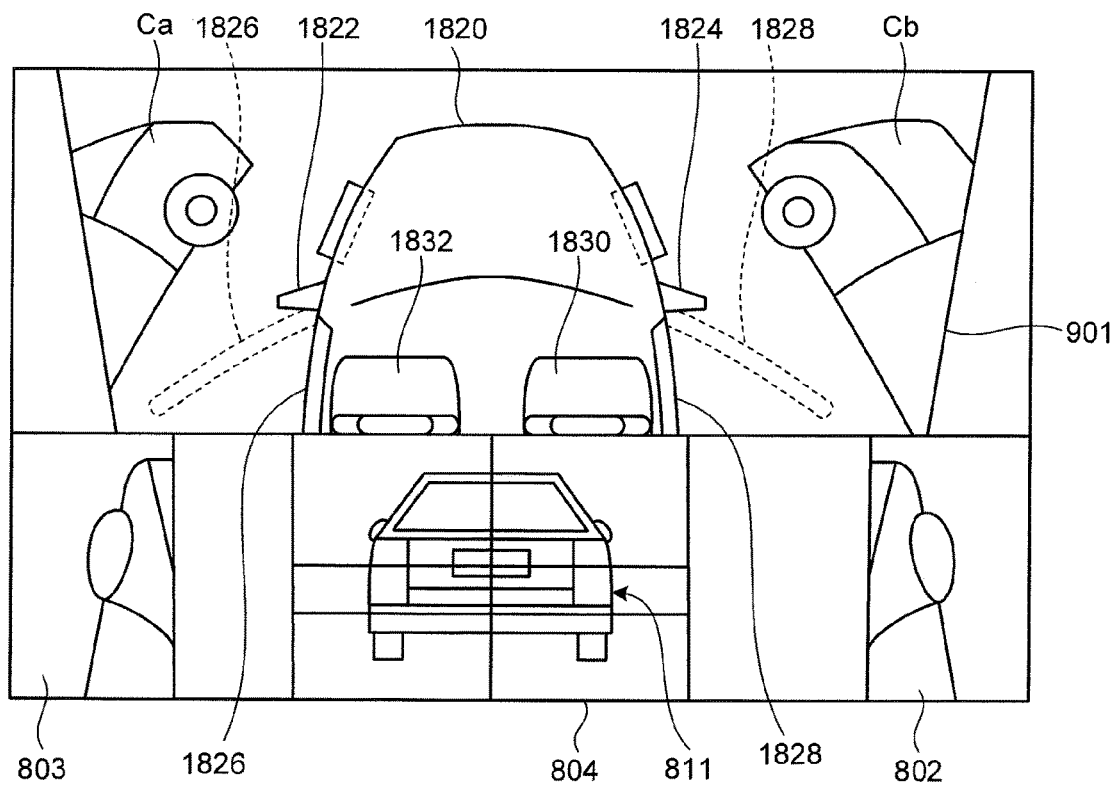
FIG. 18 is a drawing that illustrates an example of an underfloor display screen according to a fourth embodiment.

FIG. 18 illustrates another example that superimposes identification information from which a specific part of the current vehicle is identifiable. In the example of FIG. 18, various kinds of outlines are superimposed on the captured image data 901 in order to help a passenger of the vehicle smoothly get out of the vehicle. The configuration of the display screen exemplified in FIG. 18 is the same as the configuration in FIG. 9. The display example of FIG. 18 is an assisting image designed for enabling the driver to easily understand the relation between the vehicle and its surroundings when parking the vehicle in a parking space. With such an image, the driver can easily adjust the parking position and easily understand the conditions around the vehicle when getting out of the vehicle. As FIG. 18 illustrates, in addition to an outline 1820 of the vehicle body superimposed on the captured image data 901, outlines 1822 and 1824 indicating the positions of respective side mirrors are displayed in order to enable the driver to easily understand the position of the own vehicle with respect to other vehicles Ca and Cb captured in the previously photographed image. By reference to the positions of the side mirrors, which help the driver understand the position of the vehicle on the screen, the driver easily understands the relative position of the own vehicle with respect to other vehicles Ca and Cb.

By displaying an outline 1826 representing the closed position of the door on the passenger seat side and an outline 1828 representing the closed position of the door on the driver's seat side, and an outline 1830 representing the position of the driver's seat and an outline 1832 representing the position of the passenger seat, the driver can easily understand the relative position of the own vehicle with respect to other vehicles Ca and Cb. Furthermore, by displaying the outlines 1826 and 1828 representing positions of the doors and the outlines 1830 and 1832 representing positions of the seats, the driver can check in advance whether any puddles, obstacles, and the like exist around the position where a passenger steps out of the vehicle that has been parked. Based on the check, the driver can easily adjust the parking position.

As a modification, open doors (the outlines 1826 and 1828 in a dotted line) may be displayed. In this case, the passenger can be made aware in advance of the distances from respective doors to other vehicles Ca and Cb when the doors are open, that is, whether the doors contact with the vehicles and how wide the passenger can open the doors. Furthermore, the passenger can easily check the position where the passenger opens the door and steps out of the vehicle. In the case of FIG. 18, such outlines are displayed in a superimposed manner that corresponds to the ranges of the driver's seat and the passenger seat. In another embodiment, such an outline may be displayed in a superimposed manner that corresponds to the range of the backseat of a four-door vehicle. With this configuration, a passenger in the backseat can also be made aware of an acceptable amount of opening of the door and the condition of the position where the passenger steps out of the vehicle. In FIG. 18, a swing door is illustrated as an example; however, the embodiment is applicable to a sliding door and a tailgate with the same effects.

The captured image data 802, the captured image data 803, the display area 804, the icon 811, and others illustrated in FIG. 18 indicate the same components as those illustrated in the display example of FIG. 9. Because it is relatively easier to perceive the surroundings in on-road driving, the captured image data 901 and outlines superimposed thereon may be displayed in a full-screen mode as described earlier in FIG. 16. This configuration makes it easier to understand the positional relation between the vehicle and its surroundings.

Fifth Embodiment

Figure 19:
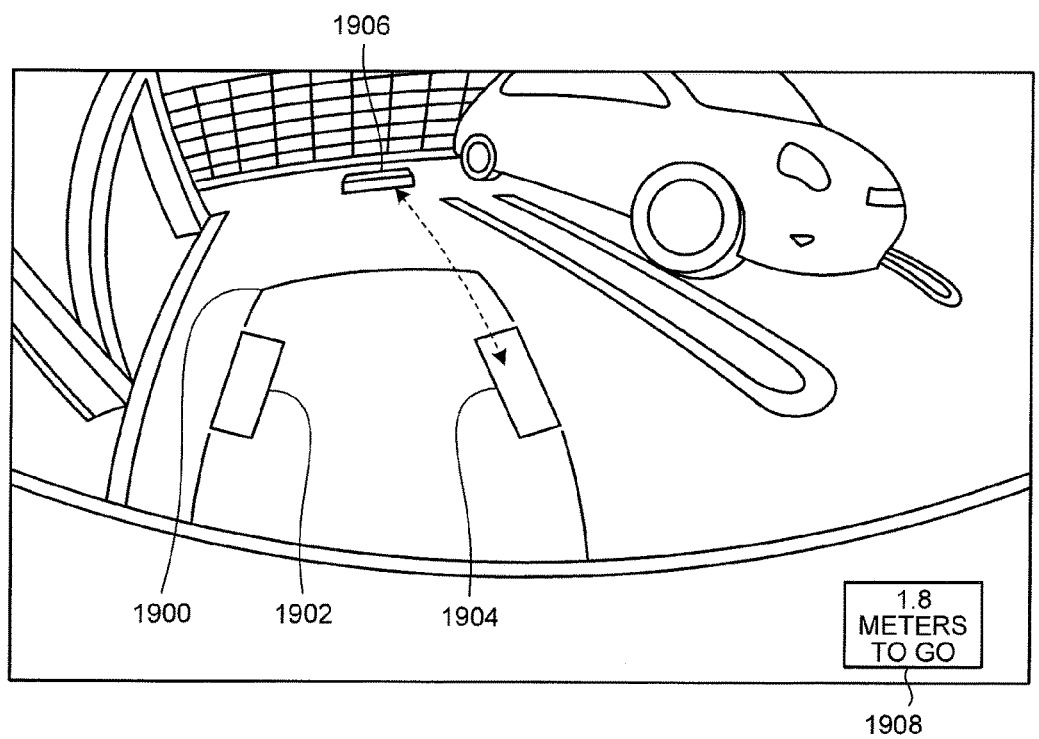
FIG. 19 is a drawing that illustrates an example of an underfloor display screen according to a fifth embodiment.

FIG. 19 is a modification of FIG. 16. In the example of FIG. 16, such a case is described that supports a vehicle entering a parking space by superimposing the outline 1601 of the vehicle body and the outlines 1602 and 1603 of respective wheels on a previous image and accordingly improving the driver's perception of the position of another vehicle and the position of the own vehicle. In the example of FIG. 19, in addition to superimposing an outline 1900 of the vehicle body and outlines 1902 and 1904 of the wheels, the distance to a wheel stopper 1906 placed in the parking space is displayed on a display area 1908. In the case of FIG. 19, the distance (the distance to a contact point) from the wheel stopper 1906 to the outline 1904 of the corresponding wheel is calculated in real time by a known method based on the positional relation indicated on the captured image data. The display area 1908 displays thereon an indication such as "1.8 meters to go". In this way, displaying an indication of the remaining distance to the wheel stopper 1906 facilitates speed adjustment when parking a vehicle and accordingly supports the vehicle to smoothly enter the parking space. In addition to or instead of the display of the remaining distance, the remaining distance may be instructed by audio guidance.

Sixth Embodiment

Figure 20:
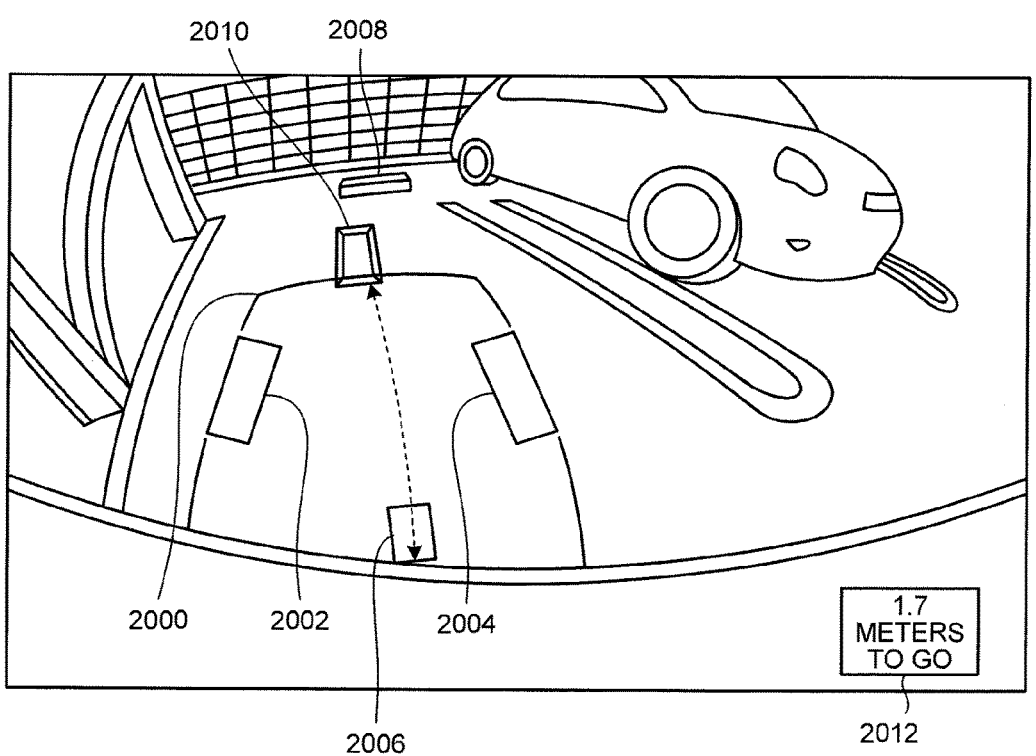
FIG. 20 is a drawing that illustrates an example of an underfloor display screen according to a sixth embodiment.

FIG. 20 is a modification of FIG. 19. More non-contact charging devices have been installed in parking spaces with the increase in numbers of electric vehicles. When using a non-contact charging device, a precondition for efficient charging of the vehicle is to set a power receiving device of the vehicle in such a manner that accurately faces a power supply device installed on the road. As described above, non-contact charging devices are installed to various places, and a driver may sometimes charge the vehicle in unfamiliar places. FIG. 20 illustrates an example that guides the driver in such a situation for accurately parking the vehicle at a charging position. In specific, in order to support a vehicle entering a parking space, an outline 2000 of the vehicle body and outlines 2002 and 2004 of the wheels are superimposed on a previous image. In addition to these outlines, an outline 2006 of a power receiving device installed to the vehicle is superimposed on the image. The distance to a power supply device 2010 placed in front of the wheel stopper 2008 in the parking space is displayed on a display area 2012. In the case of FIG. 20, the relative distance from the power supply device 2010 to the outline 2006 of the power receiving device is calculated in real time by a known method based on the positional relation indicated on the captured image data, and an indication such as "1.7 meters to go" is displayed on the display area 2012. Displaying a remaining distance to a power receiving position makes it easier to adjust the position of a vehicle when charging the vehicle, which accordingly helps the driver smoothly prepare for the charging operation.

The display may be automatically switched to such a charging-help mode illustrated in FIG. 20, for example, when the driver turns on a charging-help mode switch installed near the driver's seat or when the vehicle in the necessity of being charged receives a radio wave generated by the power supply device 2010 installed on the road, and the outline 2006 of the power receiving device and the display area 2012 may be accordingly displayed. If it is difficult to recognize the power supply device 2010 on the photographing screen, the position of the power supply device 2010 may be detected based on the intensity or the like of the radio wave generated by the power supply device 2010. The outline of the power supply device 2010 may be thereafter superimposed on an image having been previously photographed by an in-vehicle camera. Although the charging-help mode sufficiently works with display or audio guidance of the remaining distance alone, it is further possible to display an arrow or make audio guidance to correct displacement in the lateral direction. Information such as a remaining distance and a direction for correction may be informed with audio guidance alone.

Seventh Embodiment

In the above-described embodiments, such a configuration that the outline of the current vehicle is superimposed on a previously photographed image exerts effects of easily understanding the relation between the position of the current vehicle and its surroundings. When a previous image is used in on-road driving, a moving object such as a pedestrian and another vehicle may sometimes be found in a stored image. If the outline of the current vehicle is superimposed on a previous image with a moving object, such a composite image is generated that displays the vehicle contacting or overlapping with the moving image that is no longer existing at the moment, which causes a sense of strangeness with the image.

In the embodiments, if a moving object happens to be included in a previous image, it is possible not to store the data in the ring buffer 404 or, even if the data is stored, not to use the data for the superimposing display processing. In this case, such display or audio guidance is preferably made that informs the user that the previous image cannot be displayed. With this processing, no senses of strangeness are caused on the displayed image.

It is determinable whether an image photographed by an in-vehicle camera includes therein any moving objects such as a pedestrian and another vehicle using, for example, an obstacle recognizing function embedded in a photographing system. With collaboration with an existing system, a system can be implemented at a reduced cost that determines not to use data of a previous image including therein a moving object, for example. The number of usable data pieces may be excessively decreased by performing detection of a moving object in the whole area of acquired image data and performing processing to determine the detected data to be unusable. In this case, it is possible to estimate a traveling direction of the vehicle based on information obtained from the rudder angle sensor 19 and the tire angle sensor 13b and perform detection of a moving object exclusively in the area relating to the vehicle. This process can minimize the number of data pieces determined to be unusable, thereby achieving the superimposing processing using a previous image in a good condition.

Eighth Embodiment

As an opposite case to the seventh embodiment, when the outline of the current vehicle is superimposed on a previous image, a moving object (such as a pedestrian and another vehicle) may suddenly appear during display of the previous image. The moving object that has appeared does not exist on the previous image, and the display device thus does not display the object. In this case, the driver can visually recognize the moving object having appeared, and the driver may thus feel it strange that an actually existing object is not displayed on the screen. In this case, it is possible to forcibly switch the screen to a current display mode displaying a current image. This switching of the screen to the current display mode facilitates ensured recognition of the moving object by the user.

An existing method for detecting a moving object can be used to detect a moving object that has appeared during display of a previous image. For example, it is effective to perform image recognition on a current image being currently acquired by an in-vehicle camera. A sonar, a laser radar, a millimeter-wave radar may also be applicable.

Although switching to a current image is particularly effective in on-road driving, in which more moving objects are likely to appear, this method is applicable even to off-road driving. For example, off-road driving sometimes requires sensitive driving operation, and attention of the driver may therefore be concentrated on the display device, with which the driver can understand detailed conditions of the underfloor area of the vehicle. In other words, the driver may become less aware of the current surroundings. By switching the screen to the current image in response to detection of entering of a moving object during display of the previous image, the driver can be made aware of the current conditions promptly and surely.

If the user requests display of a previous image in the case that an obstacle such as a moving object or a stationary body is detected during display of a current image, the surroundings-monitoring ECU 14 may display a "confirmation screen" asking if the previous image can be displayed. In another embodiment, once the system switches the screen to a current image, switching to a previous image may be forbidden until a particular cancellation procedure is executed or until a particular time has passed. With this process, the user becomes certainly aware that a moving object has appeared.

Ninth Embodiment

In the above-described embodiments, each of the display areas indicating the front area (see FIGS. 8, 9, 17, and 18) is substantially in the shape of trapezoid (an trapezoidal shape, substantially trapezoidal display area, a trapezoidal display area) arranged in the upper block from the center with its short side down. Displaying the front display area in a shape having its short side down enables a display to present the front display area as if it is a standing screen with an appearance of depth. With this arrangement, such an image can be displayed that is closer to the surroundings actually perceived by the user (such as a driver and a passenger). Furthermore, the front display area is in a different shape from the shapes of the lateral display areas (display areas in a substantially rectangular shape in the embodiments), which display images of the left side and the right side in the direction of the vehicle width. This configuration exerts effects of emphasizing that the area displaying the front area and the areas displaying the respective lateral areas, which are displayed on the same screen, are imaged from different viewpoints (a standing screen for the front display area and a downward view for the lateral display areas) from each other, which can improve visibility of the user. As the example illustrated in FIG. 17, if each of the lateral display areas extends to the side of the front display area, assigning different shapes to the front display area and the lateral display area makes these areas distinguishable from each other. In the embodiments, each of the lateral display areas does not include the area extending upward from the road surface. Examples of a substantially trapezoidal display area may include a trapezoidal display area having each side drawn with a straight line and a shape having any sides drawn with a curved line. For example, the area displaying the captured image data 801 in FIG. 8 may have its long side drawn with a curved line convex in the outward direction of the area. Likewise, the short side may be drawn with a curved line convex in the outward direction of the area. The area displaying the captured image data 801 may have its lateral sides (the oblique sides) drawn with a curved line convex in the outward direction. Conversely, these sides may be drawn with a curved line convex in the inward direction of the area. For example, a substantially trapezoidal shape referred to in the embodiments includes a sector shape having its long side drawn with a curved line convex in the outward direction of the area and its short side drawn with a curved line convex in the inward direction of the area. The above-described curved line may be used for a part of a substantially trapezoidal shape or used for a plurality of parts of the substantially trapezoidal shape. Use of a curved line for a side of the substantially trapezoidal shape can add various types of design to the shape of the display area and can make it easier to distinguish the front display area from the lateral display areas each in a substantially rectangular shape.

FIG. 17 illustrates a modification of a screen on which display processing has been performed by the display processing unit 406. In the case of FIG. 17, the display areas (the lateral display areas) for the captured image data 1702 and 1704 extend frontward with respect to the display area (the front display area) for the captured image data 1700, thereby making it easier to understand the relation between the lateral images and the front image and accordingly enabling the driver to understand the surroundings of the vehicle more easily. The captured image data 1700 is displayed on the front display area that is "a substantially trapezoidal display area" as described above, which improves visibility of the captured image data 1700. As the example of FIG. 17, if each of the lateral display areas extends to the side of the front display area, displaying the lateral areas and the front area in different shapes makes the areas distinguishable from each other. Such a "substantially trapezoidal display area" is applicable in displaying a current image photographed by the imaging unit 16a as illustrated in FIGS. 8 and 17 and in displaying a previous image as illustrated in FIG. 9. Visibility is therefore improved in both cases.

In the example illustrated in FIG. 17, the surroundings-monitoring ECU 14 acquires the operation condition of the steering 4 (the steering wheel) based on the output data from the rudder angle sensor 19, estimates the directions of the front wheels 3F, and superimposes the outline 1706 of the vehicle body and the outline 1708 of the left front wheel on the front display area as a course indication indicating an estimated direction of travel of the vehicle 1. The direction in which the vehicle 1 is going to move is clearly perceived by displaying the outline 1706 of the vehicle body and the outline 1708 of the left front wheel in the front display area, and this configuration enables the driver to easily understand the relation between the vehicle 1 and its surroundings. Consequently, such kind of driving support can be provided that smoothly avoids an obstacle by referring to the display area with improved visibility because of its substantially trapezoidal shape.

In the above-described embodiments, a previously imaged captured image data is displayed without being composed with captured image data currently being imaged. By displaying captured image data photographed at a point in time instead of displaying composite image data generated from captured image data imaged in different time series, a blind area generated with respect to the position of the current vehicle 1 is displayed to the driver without causing a sense of strangeness with the image.

Such an example has been described in the above-described embodiment that displays captured image data having an image of an area including the road surface in a forward direction of the vehicle 1 and the horizon, that is, captured image data imaged from an oblique view point. The embodiment is, however, not intended to limit image data to be displayed or a view angle for photographing the image. As another example, image data captured in a birds-eye view (in a top view) may be displayed.

The surroundings-monitoring unit according to the above-described embodiments displays previously imaged captured image data, thereby presenting the driver with conditions of a blind area (such as peripheral areas of the respective front wheels 3F of the vehicle 1) generated around the vehicle 1 without causing a sense of strangeness with the image. This configuration reduces stress of driving.

The surroundings-monitoring unit according to the above-described embodiment displays an outline or the like indicating the position of the current vehicle 1 on previously imaged captured image data. This configuration enables the driver to easily understand the relation between the vehicle 1 and its surroundings.

The surroundings-monitoring unit according to the above-described embodiment displays captured image data having been photographed by the imaging unit 16 at a previous position of the vehicle when the surroundings-monitoring unit receives selection of the underfloor display. In other words, such an example has been described in the above-described embodiment that performs no image composition using captured image data having been captured in different time series such as current captured image data and previous captured image data. In this way, performing no image composition using a plurality of pieces of image data having been captured in different time series can reduce the load of processing.

In the above-described first to ninth embodiments, various kinds of outlines displayed on a previous image are generated by depicting (projecting) positions of respective objects, which are projected on the road surface when the vehicle is viewed in a top view, on the previous image.

The ninth embodiment is an example of a vehicle control device or a computer program used for any of the following cases [1] to [3].

[1]

A surroundings-monitoring device including:

an acquiring unit that acquires captured image data output from an imaging unit imaging an area including a road surface around a vehicle and an area extending upward from the road surface; and an output unit that outputs the captured image data acquired by the acquiring unit to a display device so as to display the captured image data in a substantially trapezoidal display area having its short side down on a screen.

[2]

The surroundings-monitoring device according to [1], in which:

the imaging unit includes a first imaging unit that images a front or a back area of the vehicle and a second imaging unit that images a lateral area of the vehicle; and the output unit displays an image based on captured image data photographed by the first imaging unit on the substantially trapezoidal display area and displays an image based on captured image data photographed by the second imaging unit on a substantially rectangular display area.

[3]

A computer program that causes a computer to execute:

an acquiring step of acquiring captured image data output from an imaging unit imaging an area including a road surface around a vehicle and an area extending upward from the road surface; and an outputting step of outputting the captured image data acquired at the acquiring step to a display device so as to display the captured image data on a substantially trapezoidal display area having its short side down on a screen.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

EXPLANATIONS OF LETTERS OR NUMERALS 1 vehicle
16 imaging unit
100 surroundings-monitoring system 400 and 1400 surroundings-monitoring unit
401 and 1401 acquiring unit
402 angle calculating unit
403 and 1402 storing processing unit
404 ring buffer
405 receiving unit
406 display processing unit
411 rotation control unit
412 birds-eye view image generating unit
413 optical-flow calculating unit
414 and 1411 position estimating unit
415 storing unit
421 image selecting unit
422 output unit

The invention claimed is:

1. A surroundings-monitoring device comprising:
a memory unit that stores therein captured image data output from an imaging unit imaging an area including a road surface in a traveling direction of a vehicle and an area extending upward from the road surface; and
an output unit that outputs, to a display device, captured image data together with a current position of the vehicle, the captured image data having been previously imaged by the imaging unit and having an image of a road surface corresponding to a blind area existing around the current position of the vehicle in the imaged road surface, from among the captured image data stored in the memory unit, wherein
the output unit outputs only captured image data having been imaged from any position of the vehicle from among a plurality of pieces of the captured image data stored in the memory unit.

2. The surroundings-monitoring device according to claim 1, wherein the output unit superimposes identification information from which a specific part of the vehicle is identifiable on the captured image data to be output.

3. The surroundings-monitoring device according to claim 2, wherein the output unit superimposes information for identifying a specific part placed under a floor of the vehicle as the identification information.

4. The surroundings-monitoring device according to claim 1, further comprising:
an acquiring unit that acquires an amount of travel of the vehicle, wherein
the memory unit further stores therein the captured image data and positional information on a position at which the imaging unit has imaged the captured image data in a manner associated with each other, and
the output unit outputs the captured image data that has been selected as captured image data including the current position of the vehicle in an imaged area based on the amount of travel acquired by the acquiring unit and the positional information stored in the memory unit.

5. The surroundings-monitoring device according to claim 1, wherein
the output unit outputs the captured image data having been imaged by the imaging unit with a direction in which the vehicle is moved and an optical axis of the imaging unit intersects with a road surface as an imaging direction.

6. The surroundings-monitoring device according to claim 1, further comprising:
a receiving unit that receives pressing of a certain button, wherein
the output unit outputs captured image data being currently imaged by the imaging unit and, when the receiving unit receives pressing of the certain button, outputs captured image data having been previously imaged by the imaging unit and including the current position of the vehicle in an imaged area from among the captured image data stored in the memory unit.

7. A computer program product including programmed instructions embodied in and stored on a non-transitory computer readable medium, wherein the instructions, when executed by a computer, cause the computer to perform:
storing, in a memory unit, captured image data output from an imaging unit imaging an area including a road surface in a traveling direction of a vehicle and an area extending upward from the road surface; and
outputting, to a display device, captured image data together with a current position of the vehicle, the captured image data having been previously imaged by the imaging unit and including a road surface corresponding to a blind area existing around the current position of the vehicle in the imaged road surface, from among the captured image data stored in the memory unit, wherein
the outputting includes outputting only captured image data having been imaged from any position of the vehicle from among a plurality of pieces of the captured image data stored in the memory unit.

8. A surroundings-monitoring device comprising:
a memory unit that stores therein captured image data output from an imaging unit imaging an area including a road surface in a traveling direction of a vehicle and an area extending upward from the road surface;
an output unit that outputs, to a display device, captured image data having been previously imaged by the imaging unit and having an image of a road surface corresponding to a current position of the vehicle in the imaged road surface, from among the captured image data stored in the memory unit; and
an image selecting unit that selects one captured image data based on the current position of the vehicle from among a plurality of pieces of the captured image data stored in the memory unit, wherein
the output unit outputs only the selected one captured image data corresponding to the current position of the vehicle from among a plurality of pieces of the captured image data stored in the memory unit.

9. The surroundings-monitoring device according to claim 8, wherein the output unit superimposes identification information from which a specific part of the vehicle is identifiable on the captured image data to be output.

10. The surroundings-monitoring device according to claim 9, wherein the output unit superimposes information for identifying a specific part placed under a floor of the vehicle as the identification information.

11. The surroundings-monitoring device according to claim 8, further comprising:
an acquiring unit that acquires an amount of travel of the vehicle, wherein
the memory unit further stores therein the captured image data and positional information on a position at which the imaging unit has imaged the captured image data in a manner associated with each other, and
the output unit outputs the captured image data that has been selected as captured image data including the current position of the vehicle in an imaged area based on the amount of travel acquired by the acquiring unit and the positional information stored in the memory unit.

12. The surroundings-monitoring device according to claim 8, wherein
the output unit outputs the captured image data having been imaged by the imaging unit with a direction in which the vehicle is moved and an optical axis of the imaging unit intersects with a road surface as an imaging direction.

13. The surroundings-monitoring device according to claim 8, further comprising:
a receiving unit that receives pressing of a certain button, wherein
the output unit outputs captured image data being currently imaged by the imaging unit and, when the receiving unit receives pressing of the certain button, outputs captured image data having been previously imaged by the imaging unit and including the current position of the vehicle in an imaged area from among the captured image data stored in the memory unit.

14. A computer program product including programmed instructions embodied in and stored on a non-transitory computer readable medium, wherein the instructions, when executed by a computer, cause the computer to perform:
storing, in a memory unit, captured image data output from an imaging unit imaging an area including a road surface in a traveling direction of a vehicle and an area extending upward from the road surface;
outputting, to a display device, captured image data having been previously imaged by the imaging unit and including a road surface corresponding to a current position of the vehicle in the imaged road surface, from among the captured image data stored in the memory unit; and
selecting one captured image data based on the current position of the vehicle from among a plurality of pieces of the captured image data stored in the memory unit, wherein
the outputting includes outputting the selected one captured image data corresponding to the current position of the vehicle from among a plurality of pieces of the captured image data stored in the memory unit.

* * * * *